(12) United States Patent
Qu et al.

(10) Patent No.: US 12,248,962 B2
(45) Date of Patent: Mar. 11, 2025

(54) PREDICTING SERVICE PRODUCT ADOPTION BY CUSTOMERS AND PROSPECTIVE CUSTOMERS

(71) Applicant: STRIPE, INC., South San Francisco, CA (US)

(72) Inventors: Huashuai Qu, Sunnyvale, CA (US); Manasij Venkatesh, Belmont, CA (US)

(73) Assignee: STRIPE, INC., South San Francisco, CA (US)

( * ) Notice: Subject to any disclaimer, the term of this patent is extended or adjusted under 35 U.S.C. 154(b) by 0 days.

(21) Appl. No.: 18/209,362

(22) Filed: Jun. 13, 2023

(65) Prior Publication Data
US 2024/0420180 A1    Dec. 19, 2024

(51) Int. Cl.
| | | |
|---|---|---|
| G06Q 30/00 | (2023.01) | |
| G06N 3/045 | (2023.01) | |
| G06N 3/084 | (2023.01) | |
| G06Q 30/0251 | (2023.01) | |
| H04L 67/50 | (2022.01) | |
| G05B 19/418 | (2006.01) | |

(52) U.S. Cl.
CPC ......... *G06Q 30/0254* (2013.01); *G06N 3/045* (2023.01); *G06N 3/084* (2013.01); *G06Q 30/0269* (2013.01); *H04L 67/50* (2022.05)

(58) Field of Classification Search
CPC .......... G06Q 30/0254; G06Q 30/0269; G06N 3/045; G06N 3/084; H04L 67/50
See application file for complete search history.

(56) References Cited

U.S. PATENT DOCUMENTS

| | | | |
|---|---|---|---|
| 2018/0322365 | A1* | 11/2018 | Yehezkel Rohekar ....................... G06F 18/2148 |
| 2019/0171928 | A1* | 6/2019 | Young ..................... G06N 20/20 |
| 2019/0220916 | A1* | 7/2019 | Levy .................. G06Q 30/0631 |
| 2019/0251707 | A1* | 8/2019 | Gupta ...................... G06T 9/002 |
| 2019/0392330 | A1* | 12/2019 | Martineau ................ G06N 5/04 |
| 2020/0242623 | A1* | 7/2020 | Savir ...................... G06V 10/82 |
| 2021/0133807 | A1* | 5/2021 | Kini ....................... G06N 3/045 |
| 2021/0201338 | A1* | 7/2021 | Konig ................ G06Q 30/0204 |
| 2023/0032739 | A1* | 2/2023 | De Jaegher ............ G06N 20/00 |

OTHER PUBLICATIONS

Customer Behavior Prediction using Deep Learning Techniques for Online Purchasing. IEEE. 2023 (Year: 2023).*
"Machine Learning and Marketing: A Systematic Literature Review". IEEE. 2022. (Year: 2022).*

* cited by examiner

*Primary Examiner* — Maria V Vanderhorst
(74) *Attorney, Agent, or Firm* — Womble Bond Dickinson (US) LLP

(57) ABSTRACT

The present disclosure is directed to models for predicting customer behavior, including the use or adoption of products by current customers and prospective customers of a service platform offering multiple service products.

19 Claims, 16 Drawing Sheets

PREDICTING SERVICE PRODUCT ADOPTION BY CUSTOMERS AND PROSPECTIVE CUSTOMERS

BACKGROUND

An organization offering a variety of services will generally try to grow user adoption of those services. Different users may be receptive to the use of different services, based on their needs and preferences. Existing users who currently use one set of services may evolve over time and find that additional services will be beneficial.

The above information disclosed in this Background section is only for enhancement of understanding of the present disclosure, and therefore it may contain information that does not form the prior art that is already known to a person of ordinary skill in the art.

SUMMARY

The present disclosure is directed to models for predicting customer behavior, including the use or adoption of products by current customers and prospective customers of a service platform offering multiple service products.

BRIEF DESCRIPTION OF THE DRAWINGS

The accompanying drawings, together with the specification, illustrate exemplary embodiments of the present invention, and, together with the description, serve to explain the principles of the present invention.

DETAILED DESCRIPTION

Figure 1A:
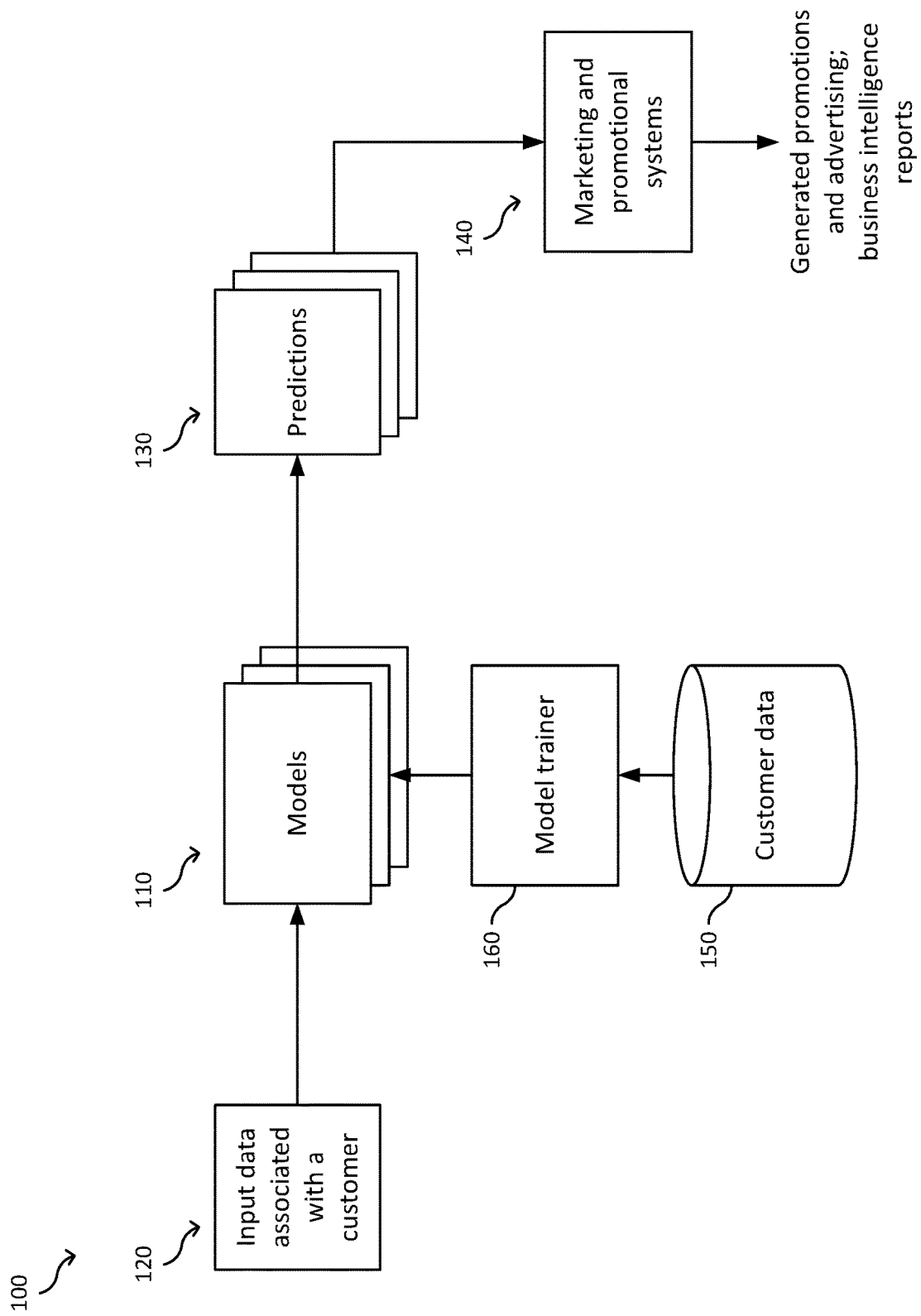
FIG. 1A is a block diagram of a service product adoption prediction system according to one embodiment of the present disclosure.

In the following detailed description, only certain exemplary embodiments of the present invention are shown and described, by way of illustration. As those skilled in the art would recognize, the invention may be embodied in many different forms and should not be construed as being limited to the embodiments set forth herein.

Providers of subscription services to organizational customers (e.g., businesses), such as cloud computing platforms, financial services platforms, and the like may offer a range of different products corresponding to different services offered to its customers. These services may be applicable to different use cases and solve different problems. For example, some businesses may subscribe to cloud computing services to host a website and to store data regarding its customers-depending on the type of data being stored, the access requirements, and usage scenarios. The cloud computing service may offer different mechanisms for storing data, including a relational database service, a key-value store service, a block storage device service (e.g., where the user may choose how to write files to the storage device), a blob store or object store service in association with an identifier (e.g., where a user may store a single file or document), a logging service, and the like. Similarly, a financial service platform may offer services related to invoicing, subscription billing, fraud detection, sales tax compliance, payments management, credit issuing, and the like.

Prospective customers and current customers of these service providers may initially be overwhelmed or confused by the large number of services available, which may slow adoption of services that would provide the most value to those users. The particular services that would be useful to any given user is highly dependent on the customer and their particular needs. In some circumstances, human sales agents conduct sales interviews with customers and prospective customers to understand their needs and to make recommendations based on those understandings.

However, personalized, human sales agents are expensive. In addition, as the number of different services offered by the service provider increases, it becomes increasingly challenging for a salesperson to understand the wide range of options and to understand which products may be useful for a given customer or prospective customer. Accordingly, aspects of embodiments of the present disclosure relate to automatically predicting service product adoption by customers and prospective customers. Some embodiments of the present disclosure relate to automatically computing propensities of prospective customers to adopt different products offered by the service provider. Some embodiments of the present disclosure further relate to automatically computing propensities of current customers to adopt products that they are not currently subscribed to. In addition, some aspects of embodiments of the present disclosure relate to automatically calculating the conditional revenue to be earned if a customer were to adopt a given product, which may be referred to as a conditional product revenue.

These product adoption propensities and conditional product revenue computations may be used to guide the targeted marketing of products to prospective customers and current customers. In some embodiments, the product propensity predictions are used to automatically provide guidance (e.g., displayed on a user interface of a computing system) to sales agents to suggest talking points regarding particular products to be promoted during discussions with a prospective customer. In some embodiments, the product propensity predictions are used to guide the display of target advertisements to prospective customers and current customers (e.g., in the form of targeted e-mails, banner advertisements, and product recommendations in a user interface of a computing system). In some embodiments, the conditional product revenue calculations are used to determine the channels by which the targeted promotions are delivered (e.g., reserving the use of expensive sales agents to combinations of customers and products with high conditional product revenue).

FIG. 1A is a block diagram of a service product adoption prediction system 100 according to one embodiment of the present disclosure. As shown in FIG. 1A, the service product adoption prediction system 100 includes a plurality of trained models 110. The trained models 110 are configured to take input data 120 associated with a customer and to output predictions regarding the propensity of the customer to adopt (e.g., purchase or subscribe to) particular products and to output predictions 130 regarding the conditional product revenue for those products. Types of input data 120 include, but are not limited to, descriptions of the customer (e.g., in text), customer behavior data (e.g., interactions with a platform), and customer financial data (e.g., volume of transactions, size of transactions, geographic distribution of transactions, etc.).

As noted above, in some embodiments, the predictions generated by the trained models 110 are provided to product marketing and promotion systems 140 to generate promotions or targeted advertisements. Examples of product marketing and promotion systems 140 include, but are not limited to, automatic targeted advertisement generation (e.g., paper and/or electronic targeted mailings, web-based advertisements, and native promotions within a software application such as a native application or a web application) and business intelligence reports (e.g., for guiding sales agents during sales calls), as will be discussed in more detail below.

In some embodiments, the trained models 110 may be trained based on customer data in a customer data store 150 collected from current customers of the service provider and their usage activity of the platform. In some embodiments, a model trainer 160 is configured to retrieve the usage data in the customer data store 150 and to train or update the trained models 110 based on the usage data in the customer data store 150. In some embodiments, the model trainer 160 periodically retrains the trained models 110 based on updates to the usage data in the customer data store 150 and/or due to changes in the product offerings (e.g., addition or removal of product offerings), as will be discussed in more detail below.

Figure 1B:
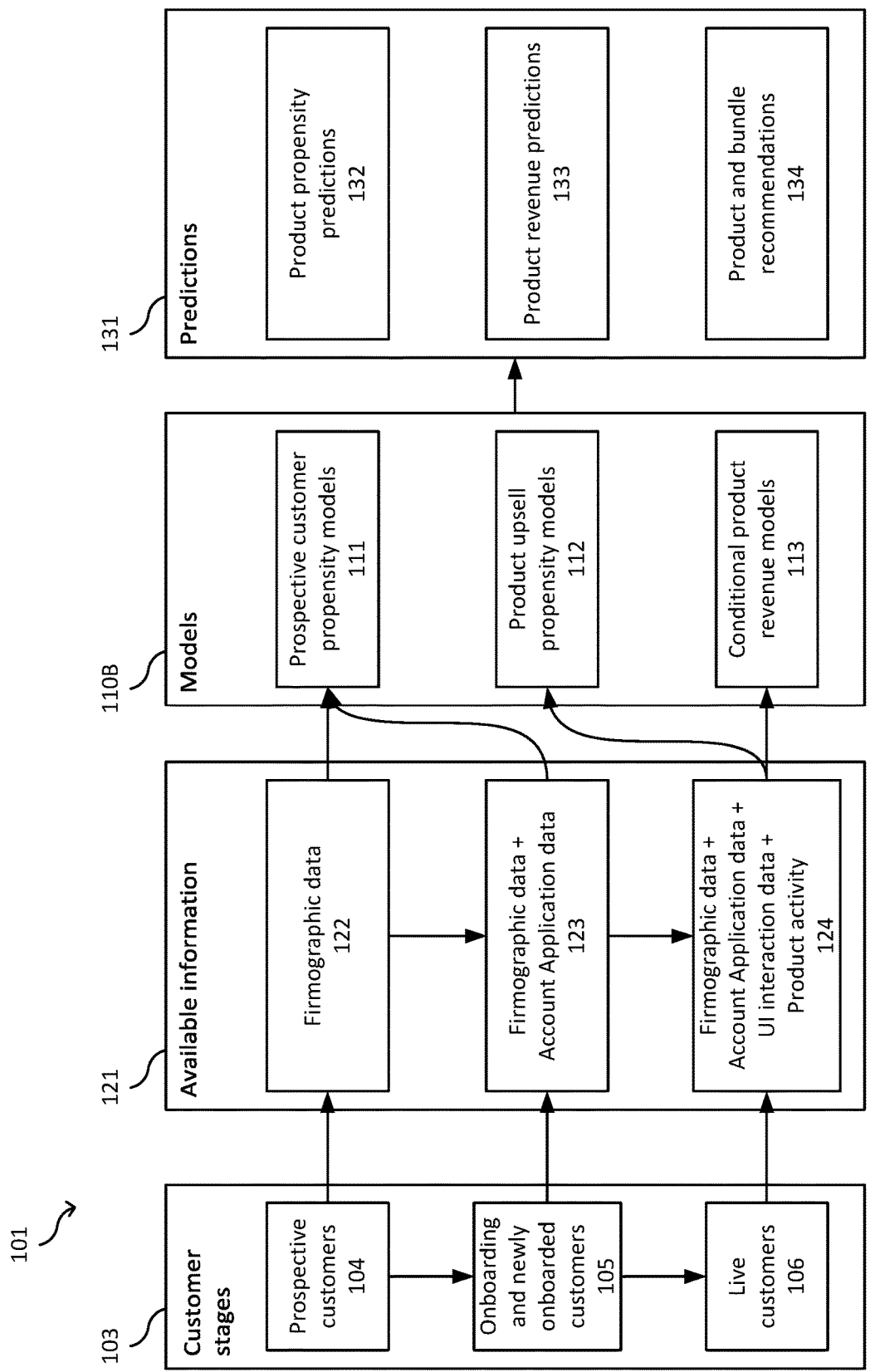
FIG. 1B is a block diagram depicting the use of available information at different stages of a customer or prospective customer relationship with an organization to predict product propensity and conditional revenue and to generate marketing and product promotion messages to customers according to one embodiment of the present disclosure.

FIG. 1B is a block diagram depicting the use of available information at different stages of a customer or prospective customer relationship with an organization to predict product propensity and conditional revenue and to generate marketing and product promotion messages to customers according to one embodiment of the present disclosure. In the block diagram 101 of FIG. 1B, customers are shown as progressing between different stages in their relationship with the service provider, including being a prospect or prospective customer 104, progressing to be a customer that is onboarding 105 (e.g., a newly signed-up customer), to a customer that is an active and live customer 106 of the system provided by the service provider.

During these customer stages 103, the types of available information 121 may differ. For example, at the prospective customer 104 stage, the service product adoption prediction system may only have access to firmographic data 122. This firmographic data 122 generally includes publicly available information about a given customer (company), such as industry classification (Standard Industry Classification), company size, location, that may be available directly from the company or through government records. In some cases, third parties may collect and publish information regarding companies (e.g., summaries of business including target market and business offerings) where this information may be included in the firmographic data 122. In some circumstances, customers may publish their own websites, where those websites include text descriptions of their business. In the case of customers that are publicly traded companies, the firmographic data may include published information regarding the company (e.g., as available in the United States through the Securities and Exchange Commission).

At the onboarding 105 stage, it is assumed that the customer has completed a sign-up process that requested the customer to provide information describing their business. The responses from the customer may include, but is not limited to, answers to multiple choice questions (e.g., ranges of revenue or transaction volumes), numerical values (e.g., number of employees, number of customers, revenue in the past quarter, etc.), and free-form text descriptions of the business of the customer and/or their reasons for signing up with the service provider, such as a list of current pain points in their business. Accordingly, the available information at the onboarding stage may include both the firmographic data (discussed above) along with the account application data 123 as provided by the customer.

At the live customer 106 stage in which the customer is an active user of the software platform, the firmographic data and account application data as discussed above is still available in addition to information collected through customer interactions with the service provider 124. These interactions may include customer interactions with the user interface (e.g., web-based application, native desktop application, mobile app, and the like) and customer usage of the services (e.g., growth in usage of computing resources in the case of a cloud computing service or growth in number of transactions processed in a financial service provider).

As noted above, the trained models 110B may be used to compute predictions of, for example, a first model 111 predicting the propensity of a prospective customer 104 or newly onboarded customer 105 to adopt various products, a second model 112 predicting the propensity for a current customer or live customer 106 to be upsold on a product that the customer is not currently using, and a third model 113 to compute the conditional product revenue associated with a customer. These models 110B may then be used to generate predictions 131 based on the available information 121 for a given customer (e.g., prospective customer 104, newly onboarded customer 105, or live customer 106), where these predictions may include product propensity predictions 132, product revenue predictions 133, and product and bundle recommendations 134.

Figure 2A:
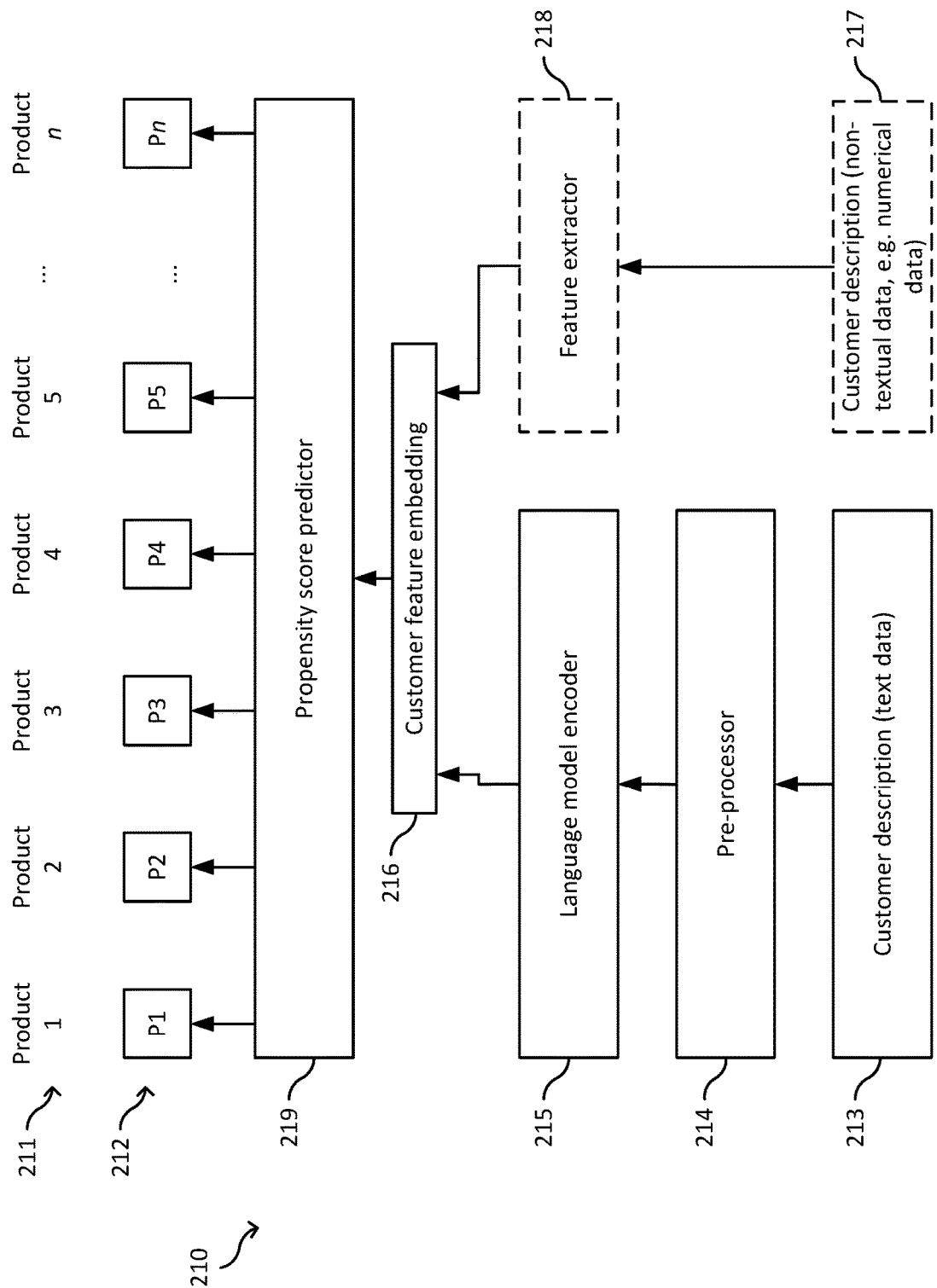
FIG. 2A is a block diagram depicting components of a system for predicting the propensity of a customer or prospective customer to adopt services offered by a platform according to one embodiment of the present disclosure.

FIG. 2A is a block diagram depicting components of a system 210 for predicting the propensity of a customer or prospective customer to adopt services offered by a platform according to one embodiment of the present disclosure. The system 210 may be implemented using one or more computing devices, examples of which are described in more detail below with respect to FIGS. 6-8. For example, the input data, intermediate data, and output data (e.g., predictions) computed by the system 210 may be stored in one or more memory circuits of one or more computing devices, where the intermediate results and the output predictions may be computed based on the data input are computed using one or more processing circuits of the one or more computing devices. These processing circuits may include, but are not limited to, central processing units (CPUs), graphics processing units (GPUs), neural accelerator units, field programmable gate arrays (FPGAs), application specific integrated circuits (ASICs), and the like. The processing circuits are configured to perform operations according to various embodiments of the present disclosure using program instructions that may be stored in one or more memory circuits (e.g., the same memory circuits that store the input data, output data, and intermediate results, or different memory circuits).

As shown in FIG. 2A, the system may be configured to predict the propensity of a customer (e.g., prospective customer or a newly onboarded customer as shown in FIG. 1B) to adopt each of a plurality of different products 211, illustrated in FIG. 2A as Product 1 through Product n. Each of the products 211 may relate to a different service offered by the service provider. For example, in the case of a financial services provider, these may include a product for a customer to manage subscriptions to services that are provided by the customer to its own users, a product for managing the computation, collection, and payment of sales taxes across different jurisdictions, and a product for managing the issuance of credit cards. As another example, in the case of cloud computing services provider, these may include a web app hosting service, a virtual machine service, a database service, a key value store service, a block storage device service, an infrastructure health monitoring service, an alert service, a message queue service, and the like.

As noted above, the system 210 is configured to compute, for a given customer, a plurality of propensities 212 corresponding to each of the products 211. Each of the propensities 212 represents a degree of product fit between the product and the given customer (e.g., a likelihood, probability, or other numerical metric). These propensities 212 may therefore be used to evaluate the likelihood that the given customer will adopt the corresponding product (e.g., become a subscriber or user of that corresponding product).

The inputs to the system 210 include the data that is available for a given customer. As noted above, for a prospective customer, the system 210 may have access only to publicly available data describing the customer (e.g., as collected from literature published by the customer such as a website operated by the customer, from third party aggregators of information, and from published descriptions in official sources). In addition, as noted above, in the case of an onboarded customer (who has not yet started using the services), the customer may also provide text-based descriptions of themselves.

Figure 2B:
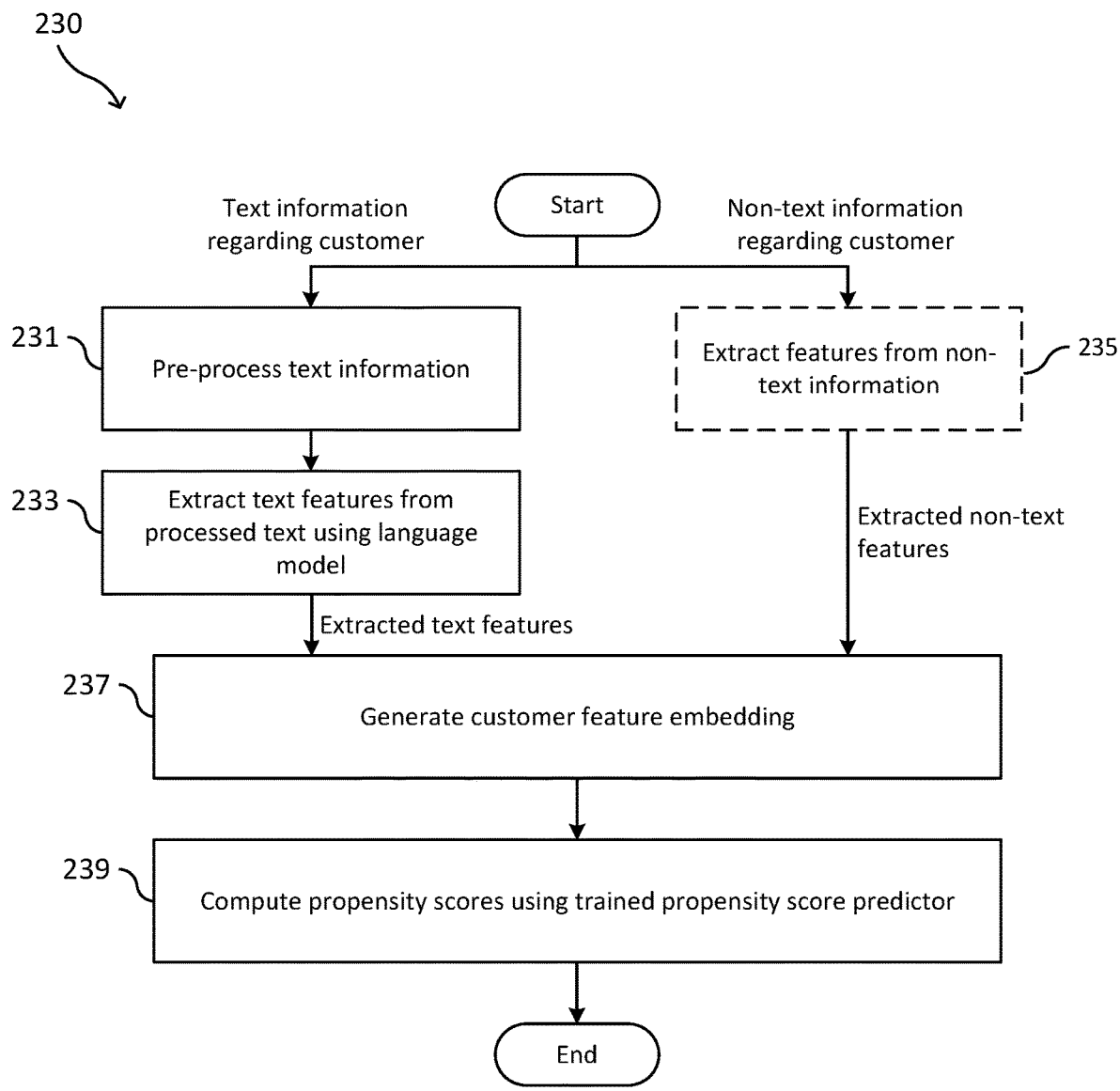
FIG. 2B is a flowchart depicting a method for predicting the propensity of a customer or prospective customer to adopt services offered by a platform according to one embodiment of the present disclosure.

FIG. 2B is a flowchart depicting a method 230 for predicting the propensity of a customer to adopt services offered by a platform according to one embodiment of the present disclosure.

The available text-based data 213 regarding the customer to be evaluated for propensity to adopt various product may be collected together and supplied to a pre-processor 214. At 231, the pre-processor applies transformations to the text data using natural language processing (NLP) techniques, such as removing stop words (e.g., words with low semantic value such as "the", "and", "a", "at", "which", "that", "on", and the like), computing the length of the collected text, removing duplicate chunks of text, and the like.

At 233, the pre-processed text is then provided to a language model encoder 215, which is configured to generate a customer feature embedding 216 (or feature vector) of the pre-processed text (e.g., a representation of the text as a vector of numbers) in an embedding space (e.g., or latent space or latent feature space, where similar customers have similar customer feature embeddings). Examples of language models that may be used to perform the embedding of the text into a latent space include, but are not limited to, Bidirectional Encoder Representations from Transformers (BERT), generative pre-trained transformers (GPT), and the like. The language models may be pre-trained or fine-tuned based on the types of text data expected to be presented to the language model encoder 215 (e.g., text descriptions of the types of companies that are expected to be customers of the service provider).

As noted above, in some circumstances the system may have access to non-textual data 217 regarding the customer, such as numerical data. These non-textual data 217 may include data collected from public information provided by the customer (e.g., on a website), from third-party data sources, from public sources, and the like, and may also include data collected directly from the customer during sign-up. At 235, in a case where such non-textual data is available, the system 210 extracts features from this information (e.g., using feature extractor 218).

In some embodiments, the feature extractor 218 converts data into a format suitable for inclusion in the customer feature embedding 216 (or feature vector). These conversions may include, for example, normalizing input data values into specified ranges and/or applying mathematical operations to the input data values (e.g., converting input values such as revenue or company size to a normalized log scale ranging from 0 to 1), converting multiple choice responses to a one-hot encoding.

At 237, the system 210 generates the customer feature embedding 216. In circumstances where such non-textual data 217 regarding the customer is available, the extracted features from the non-textual data 217 are combined with the extracted text features (e.g., as extracted using the language model). In circumstances where no non-textual data 217 is available (e.g., only text data is available), then, in some embodiments, the system 210 inserts default values for portions of the customer feature embedding that correspond to the non-text features.

At 239, the system 210 supplies the customer feature embedding to a propensity score predictor 219, where the propensity score predictor 219 is trained to compute the plurality of propensities 212 for the given customer to adopt each of the products 211. In some embodiments, the propensity score predictor 219 is implemented using a neural network. For example, the propensity score predictor 219 may include one or more fully connected layers (FC layers) of a neural network (e.g., a neural network with a single hidden layer or a deep neural network having more than one hidden layer, where one or more of the hidden layers are fully connected layers). In various embodiments, the propensity score predictor 219 may be implemented using other trained models such as a gradient boosting with a forest of decision trees (e.g., using XGBoost).

Figure 2C:
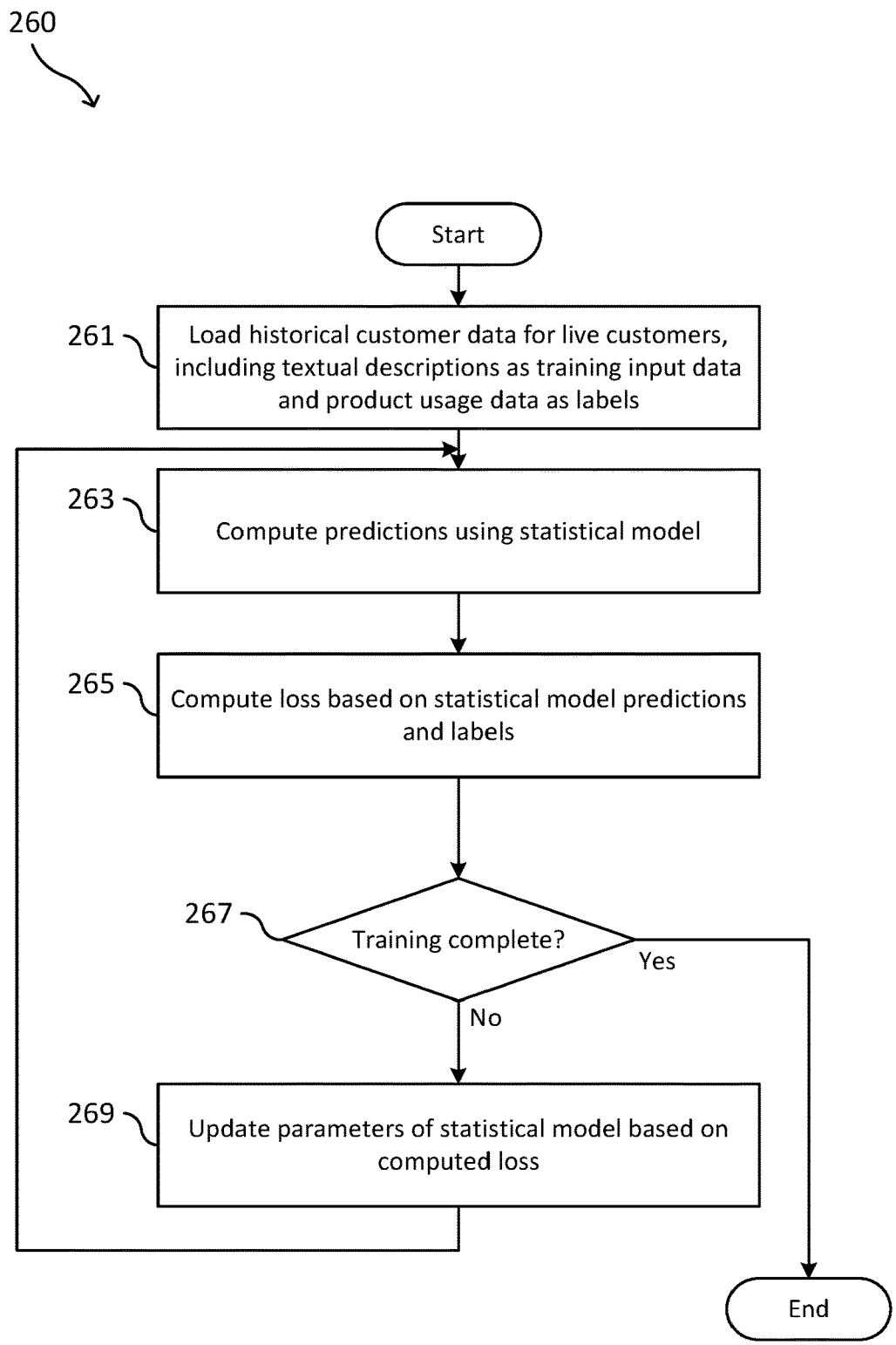
FIG. 2C is a flowchart depicting a method for training a system to predict the propensity of a customer or prospective customer to adopt services offered by a platform according to one embodiment of the present disclosure.

FIG. 2C is a flowchart depicting a method 260 for training a propensity score predictor to predict the propensity of a customer or prospective customer to adopt services offered by a platform according to one embodiment of the present disclosure. In some embodiments, the method shown in FIG. 2C is performed by the model trainer 160 as shown in FIG. 1A, where the model trainer 160 is implemented using one or more processing circuits executing instructions stored in one or more memory circuits, where the instructions configure the processing circuits to perform as special purpose devices to perform operations according to embodiments of the present disclosure.

As shown in FIG. 2C, at 261 the model trainer 160 loads historical customer data for live customers (and/or previously live customers) from the customer data store 150 as a training data set. This customer data includes information corresponding to the inputs that are to be supplied to the model (e.g., textual data collected from scraping customer websites, from third parties, from published information, and from customer responses to questions during the sign-up process). In addition, the customer data store 150 may store product usage data for products offered by the service provider since signing up with the service (e.g., which products were adopted and actively used by the customer over a time period, such as being adopted within the first 30 days or first 90 days as a live customer of the service provider). These product usage data serve as labels for the training data. Accordingly, using a method such as the method shown in FIG. 2C, the model trainer 160 trains a statistical model (e.g., a neural network or a fully connected layer thereof, a gradient boosting model, or the like) to predict the labels (e.g., the products) that will be used by a customer based on these input data.

In more detail, an initial statistical model may be provided as an additional input to the model trainer 160, where the statistical model may have its parameters (e.g., weights of connections between neurons in a case where the statistical model is a neural network) set to random values (e.g., set using a random number generator) or may have pre-trained parameters that were trained on another data set (e.g., older historical customer data or trained for a different collection of products). At 263, the model trainer 160 computes predictions using the statistical model (e.g., using its current set of parameters). These predictions may correspond to scores representing propensities for a given customer to use or adopt the various products. At 265, the model trainer 160 compares the computed predictions (the outputs of the statistical model) to the labels (e.g., the actual products used by the customers in the training data set) using a loss function to compute loss values.

At 267, the model trainer 160 determines whether the model training process for the statistical model is complete. In some circumstances, this is determined based on whether the accuracy of the statistical model is no longer improving over the previous version of the statistical model based on the previous parameters (e.g., the training of the statistical model has converged), or has improved by less than some threshold amount. In some circumstances, this is determined based on reaching some desired level of accuracy. In some embodiments, this is determined based on reaching a maximum number of training iterations. In some embodiments, this is determined based on a combination of the factors discussed above and may include additional factors.

In a case where training is not complete, at 269 the model trainer 160 updates the parameters of the statistical model based on the computed loss. In some embodiments, this is performed using gradient descent and, in the case of a neural network, the parameters of the neural network (the weights of the connections between the layers of neurons) are updated using backpropagation. After updating the parameters of the statistical model, the model trainer 160 returns to perform another iteration of the training process at 263. Different iterations of the training process may use different portions of the training data (e.g., the training data may be broken into batches).

In a case where the model training is determined to be complete, then the trained model (e.g., the trained parameters) are output by the model trainer 160, and the trained model may be included in the trained models 110 shown in FIG. 1A and FIG. 1B (e.g., after validating the model using validation data taken from the customer data store 150).

Accordingly, FIG. 2A, FIG. 2B, and FIG. 2C depict some embodiments of methods for training and implementing statistical models to compute the propensity of a prospective customer or a newly onboarded customer to adopt various products offered by a service provider based on training data from the product adoption behavior of other customers of the service provider.

Some aspects of embodiments of the present disclosure relate to further updating the system 210 to compute propensity scores for additional products (e.g., newly added products) or to remove products (e.g., remove discontinued products). For example, in the architecture shown in FIG. 2A, components such as the customer descriptions in the form of available text-based data 213, the pre-processor 214, the language model encoder 215, and the feature extractor 218 are not affected by the addition or removal of products. Instead, the addition or removal of products merely involves changing the behavior of the propensity score predictor. Accordingly, in a case where the propensity score predictor 219 is implemented using a neural network (e.g., a neural network having a single, fully connected hidden layer or a deep neural network having multiple hidden layers), changes in the collection of products for which the system 210 will generate recommendations involves re-training the propensity score predictor 219, such as by applying the method 260 shown in FIG. 2C, where the starting point of the statistical model may be the pre-trained weights of the prior model (updated to change the number of outputs or to change the mapping of the outputs to propensities for corresponding products).

In some embodiments of the present disclosure, the statistical model includes a separate, independent statistical model for each product. Accordingly, removing a product from the system (e.g., when a product is discontinued) may be performed by removing the corresponding model for that product from the statistical model (without affecting the computations of propensities for the other products) and adding a product to the system (e.g., when a new product is introduced) may be performed by training a new statistical model for that product (without affecting the computations of the propensities for the other products).

As noted above with respect to FIG. 1B, customer of the service provider may progress through various stages including prospective customers, newly onboarded customers, and live customers. Some aspects of embodiments of the present disclosure further relate to modifying the approach described above with respect to FIG. 2A, FIG. 2B, and FIG. 2C to further apply to training and using product upsell propensity models 112 as shown in FIG. 1B to compute the propensity of live customers (current users) to be upsold on products (e.g., begin to use products that they had not previously been using).

Figure 3A:
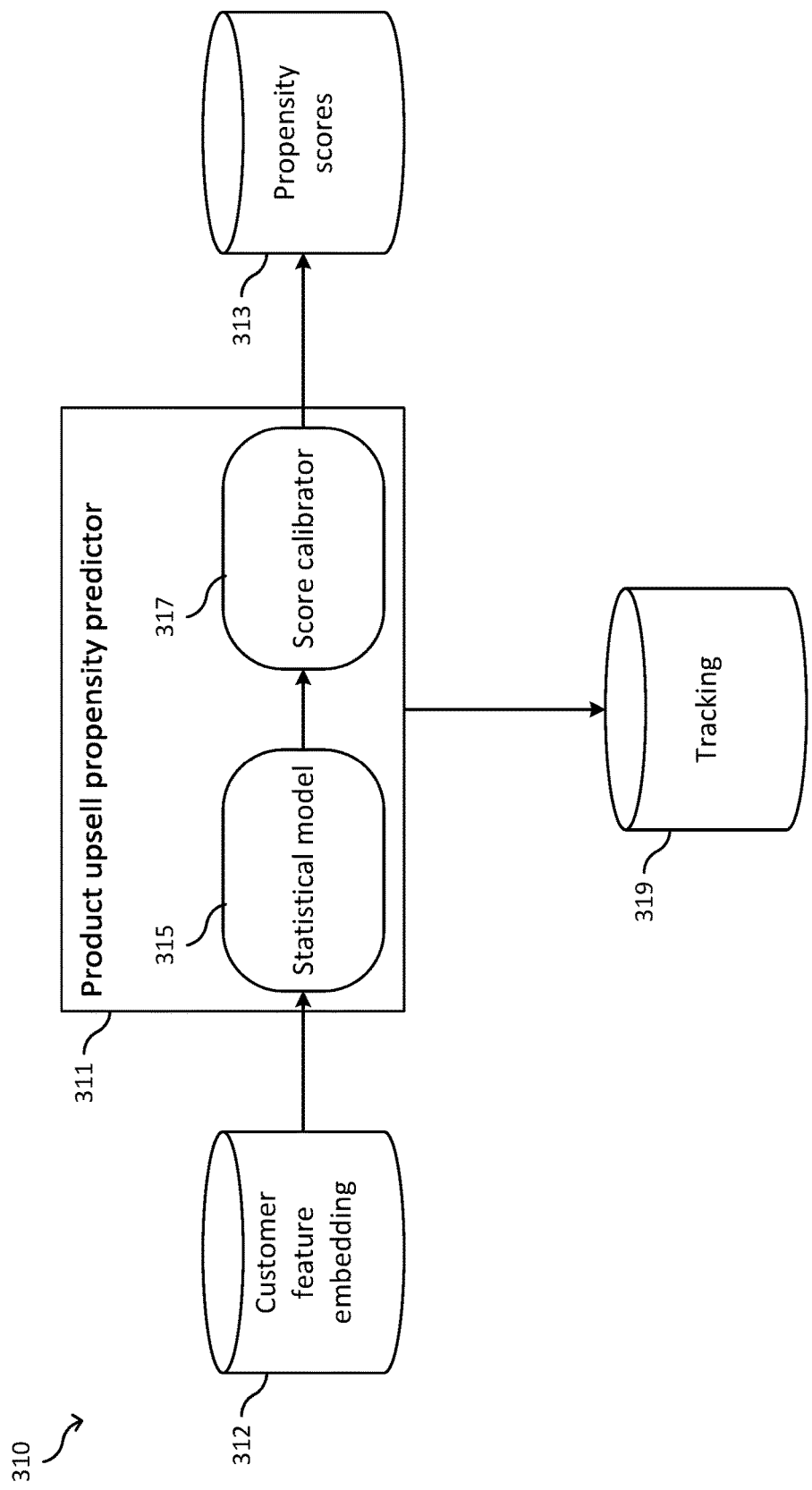
FIG. 3A is a block diagram depicting components of a system for predicting the propensity of a customer to adopt services offered by a platform based on historical interactions with the platform according to one embodiment of the present disclosure.

FIG. 3A is a block diagram depicting components of a system 310 for predicting the propensity of a customer to adopt services offered by a platform based on historical interactions with the platform (platform usage data) according to one embodiment of the present disclosure. In a manner similar to that described above with respect to the system 210 shown in FIG. 2A, the system 310 may be implemented using one or more computing devices, examples of which are described in more detail below with respect to FIGS. 6-8. For example, the input data, intermediate data, and output data (e.g., predictions) computed by the system 310 may be stored in one or more memory circuits of one or more computing devices, where the intermediate results and the output predictions may be computed based on the data input are computed using one or more processing circuits of the one or more computing devices. These processing circuits may include, but are not limited to, central processing units (CPUs), graphics processing units (GPUs), neural accelerator units, field programmable gate arrays (FPGAs), application specific integrated circuits (ASICs), and the like. The processing circuits are configured to perform operations according to various embodiments of the present disclosure using program instructions that may be stored in one or more memory circuits (e.g., the same memory circuits that store the input data, output data, and intermediate results, or different memory circuits).

As shown in FIG. 3A, the system 310 may include a product upsell propensity predictor 311 configured to take, as input, a customer feature embedding 312 and to generate propensity scores 313 for each of a plurality of different products (e.g., each of products 1 through n in a manner similar to that shown in FIG. 2A).

The customer feature embedding 312 according to some embodiments of the present disclosure includes customer textual descriptions in a manner similar to that described above, such as a current description of the customer as taken from a corporate website associated (e.g., maintained by) the customer, current information collected from third party resources describing companies, and published public information (e.g., filings with governmental organizations), and may also include updated information provided by the customer (e.g., responses to customer surveys or other requests for updated information regarding the customer). The collected information may also include non-textual data, such as categorical data and numerical data representing various characteristics of the customer (e.g., current revenue, transaction volume, and the like).

As noted above, because the system 310 further assumes that the customer is a live customer, there is additional available information regarding the customer in the form of usage data regarding interactions between the customer and the service provider.

This platform usage data may include, but is not limited to: reaching milestones (e.g., applying for service, date of first paid transaction, date of launch to public use or "go-live" date, and the like); basic features (e.g., location, customer segment, and the like); application usage information (e.g., interactions with a web application and/or native application, accessing documentation, support requests, and the like); product activity (e.g., stage of interaction, such as evaluation, adoption, live usage, level of revenue through a product, and the like); and interactions with the service provider (e.g., transaction volume through the service provider, subscriptions maintained through the service provider, invoices created through the service provider, and the like). Accordingly, user interactions with the service provider may be collected as features representing the current state of a customer. In various embodiments of the present disclosure, these collected features are processed (e.g., mathematically transformed, such as to a log scale and/or normalized) before being added to the customer feature embedding or feature vector representing the customer.

Figure 3B:
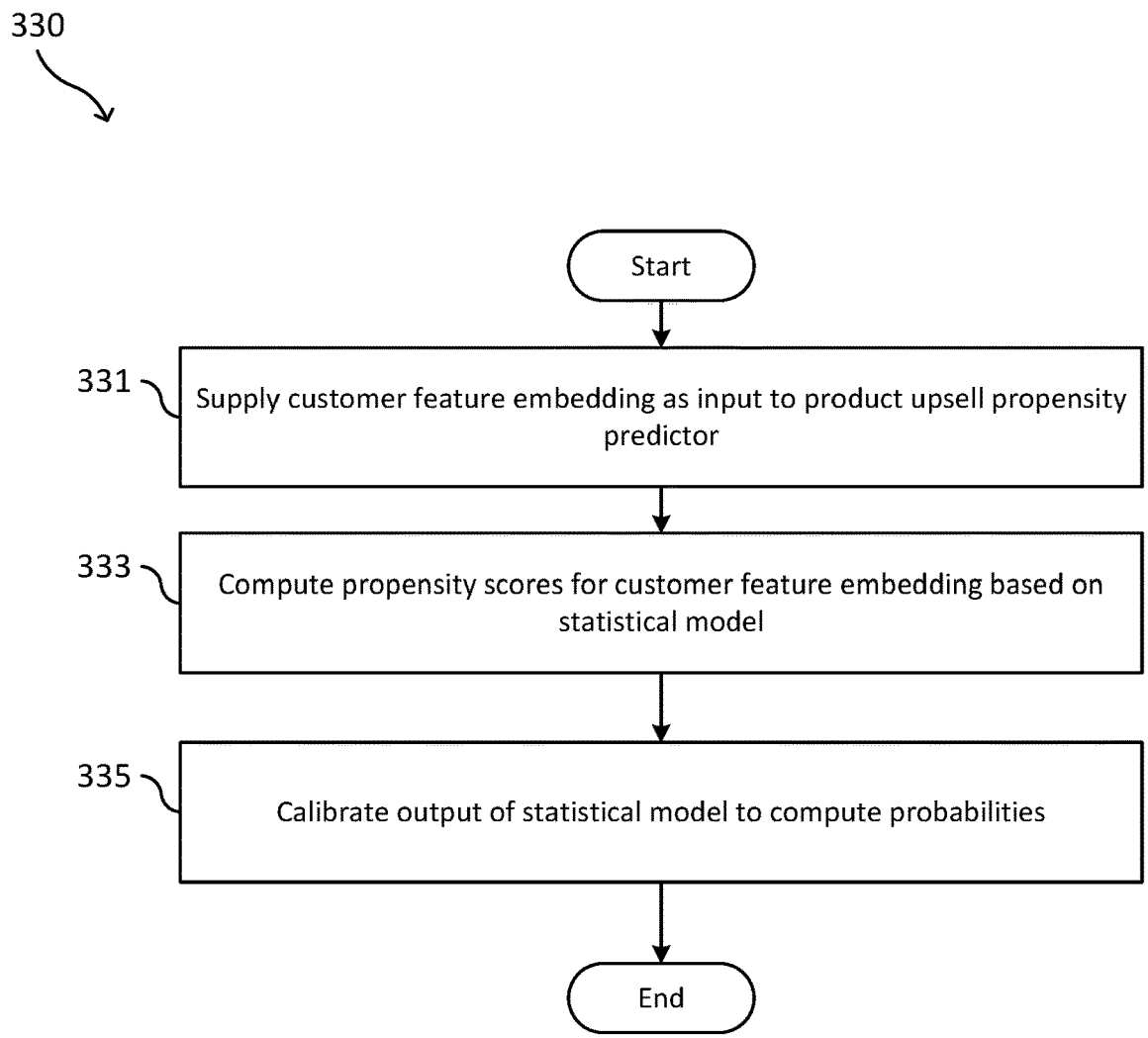
FIG. 3B is a flowchart depicting a method for predicting the propensity of a customer or prospective customer to adopt services offered by a platform based on historical interactions with the platform according to one embodiment of the present disclosure.

FIG. 3B is a flowchart depicting a method 330 for predicting the propensity of a customer or prospective customer to adopt services offered by a platform based on historical interactions with the platform according to one embodiment of the present disclosure. At 331, the system 310 supplies the customer feature embedding 312 as input to the product upsell propensity predictor 311.

As shown in FIG. 3A, the product upsell propensity predictor 311 includes a statistical model 315 that may be trained as discussed in more detail below. The statistical model computes propensity scores for the customer, as described by the customer feature embedding, to adopt each of the products within some upcoming time period (e.g., a time period such as the next 30 days or a time period such as the next 90 days).

In some embodiments, the statistical model 315 is implemented using an XGBoost model (e.g., an XGBoost classifier), although embodiments of the present disclosure are not limited thereto and other classifiers may be trained instead, such as a neural network, a deep neural network, a random forest of decision trees, and the like. In some embodiments, the output of the statistical model 315 may be poorly calibrated, such that the raw propensity scores output by the statistical model 315 cannot be reliably interpreted as probabilities. Accordingly, in some embodiments of the present disclosure, the product upsell propensity predictor 311 further includes a score calibrator 317 that is used to calibrate the raw propensity scores such that the resulting calibrated propensity scores represent probabilities. In some embodiments, the score calibrator 317 includes an isotonic regression layer to calibrate the raw propensity scores. The calibrated propensity scores (or "propensity scores") may then be output and saved to a propensity score data store for further use, such as to generate targeted upsell advertising or promotions to the customer, specifically promoting the products that have high upsell propensity for the customer. In some embodiments, a model tracking data store 319 is used to store the progress of the development of the statistical model 315, such as by storing the parameters (e.g., weights)

of the statistical model as the statistical model is trained based on the training data (e.g., as the model is updated based on additional data collected from live customers).

Figure 3C:
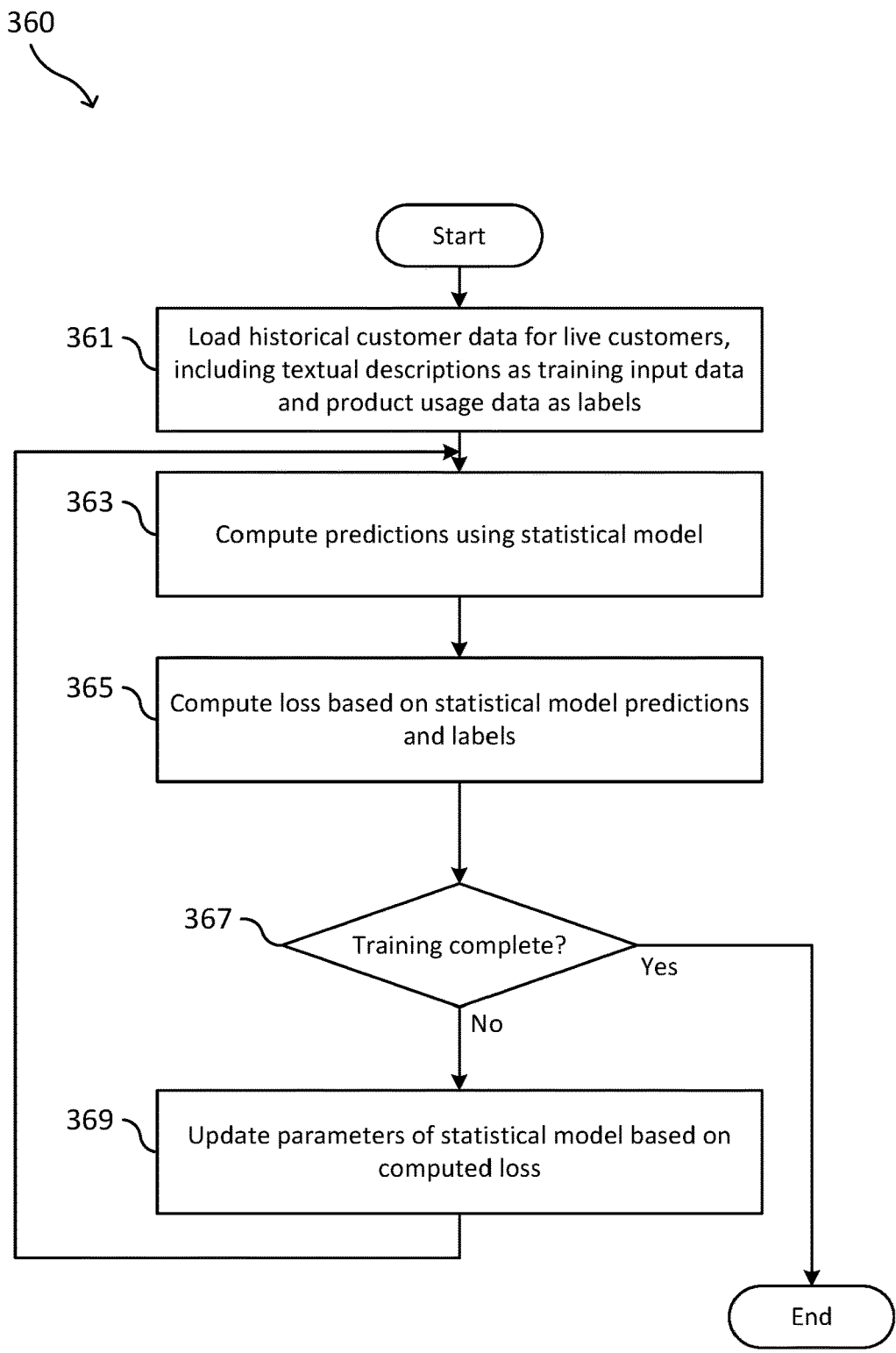
FIG. 3C is a flowchart depicting a method for training a system to predict the propensity of a live to adopt services offered by a platform based on historical interactions with the platform according to one embodiment of the present disclosure.

FIG. 3C is a flowchart depicting a method 360 for training a system to predict the propensity of a live customer to adopt services offered by a platform based on historical interactions with the platform according to one embodiment of the present disclosure.

In some embodiments, the method 360 shown in FIG. 3C is performed by the model trainer 160 as shown in FIG. 1A, where the model trainer 160 is implemented using one or more processing circuits executing instructions stored in one or more memory circuits, where the instructions configure the processing circuits to perform as special purpose devices to perform operations according to embodiments of the present disclosure.

As shown in FIG. 3C, at 361 the model trainer 160 loads historical customer data for live customers (and/or previously live customers) from the customer data store 150 as a training data set. This customer data includes information corresponding to the inputs that are to be supplied to the model (e.g., textual data collected from scraping customer websites, from third parties, from published information, and from customer responses to questions during the sign-up process) and features extracted from customer usage data as discussed above (e.g., reaching milestones, application usage information, product activity, interactions with the service provider, and the like). In addition, the customer data store 150 may store product usage data for products offered by the service provider since signing up with the service (e.g., which products were adopted and actively used by the customer over a time period, such as being adopted within the first 30 days or first 90 days as a live customer of the service provider). These product usage data serve as labels for the training data. Accordingly, using a method such as the method shown in FIG. 3C, the model trainer 160 trains a statistical model (e.g., a neural network or a fully connected layer thereof, a gradient boosting model, or the like) to predict the labels (e.g., the products) that will be used by a customer based on these input data.

In more detail, an initial statistical model may be provided as an additional input to the model trainer 160, where the statistical model may have its parameters (e.g., weights of connections between neurons in a case where the statistical model is a neural network) set to random values (e.g., set using a random number generator) or may have pre-trained parameters that were trained on another data set (e.g., older historical customer data or trained for a different collection of products). At 363, the model trainer 160 computes predictions using the statistical model (e.g., using its current set of parameters). These predictions may correspond to scores representing propensities for a given customer to use or adopt the various products. At 365, the model trainer 160 compares the computed predictions (the outputs of the statistical model) to the labels (e.g., the actual products used by the customers in the training data set) using a loss function to compute loss values.

At 367, the model trainer 160 determines whether the model training process for the statistical model is complete. In some circumstances, this is determined based on whether the accuracy of the statistical model is no longer improving over the previous version of the statistical model based on the previous parameters (e.g., the training of the statistical model has converged), or has improved by less than some threshold amount. In some circumstances, this is determined based on reaching some desired level of accuracy. In some embodiments, this is determined based on reaching a maximum number of training iterations. In some embodiments, this is determined based on a combination of the factors discussed above and may include additional factors. In a case where training is not complete, at 369 the model trainer 160 updates the parameters of the statistical model based on the computed loss. In some embodiments, this is performed using gradient descent and, in the case of a neural network, the parameters of the neural network (the weights of the connections between the layers of neurons) are updated using backpropagation. After updating the parameters of the statistical model, the model trainer 160 returns to perform another iteration of the training process at 363. Different iterations of the training process may use different portions of the training data (e.g., the training data may be broken into batches).

In a case where the model training is determined to be complete, then the trained model (e.g., the trained parameters) are output by the model trainer 160, and the trained model may be included in the trained models 110 shown in FIG. 1A and FIG. 1B (e.g., after validating the model using validation data taken from the customer data store 150).

In a manner similar to that described above with respect to the system 210, the statistical model 315 may include a single model trained to compute the propensity scores for all products for a given customer feature embedding or a plurality of statistical models, where each statistical model is trained to compute a propensity score for a corresponding product. In the case where a shared model is used for all products, adding or removing products may involve retraining the shared model based on the change in the collection of product offerings. In the case where a separate model is trained for each product, adding or removing products may involve training a separate, new model for the new product and, in a corresponding manner, removing a statistical model corresponding to a discontinued product from the collection of models.

Accordingly, FIG. 3A, FIG. 3B, and FIG. 3C depict some embodiments of methods for training and implementing statistical models to compute the propensity of a prospective customer or a newly onboarded customer to be upsold on various products offered by a service provider based on training data from the product adoption behavior of other customers of the service provider and based on platform usage data.

Service providers interested in growing their business may attempt to target prospective customers or upsell current customers on new products based on the expected revenue to be earned from selling a given product to that customer (e.g., the revenue expected to be earned based on the customer newly subscribing to the product). Accordingly, some aspects of embodiments of the present disclosure relate to computing estimates of product value or product revenue conditional on the user going live. Multiplying the conditional estimates by the product propensity scores produce the desired expected product value from users going live. (For example, a customer going live on an expensive product may produce a large amount of revenue, but if the product is a poor fit for the customer needs, the customer is unlikely to subscribe to the product and therefore marketing efforts related to that product may be wasted if the customer propensity score for that product is low.)

Figure 4A:
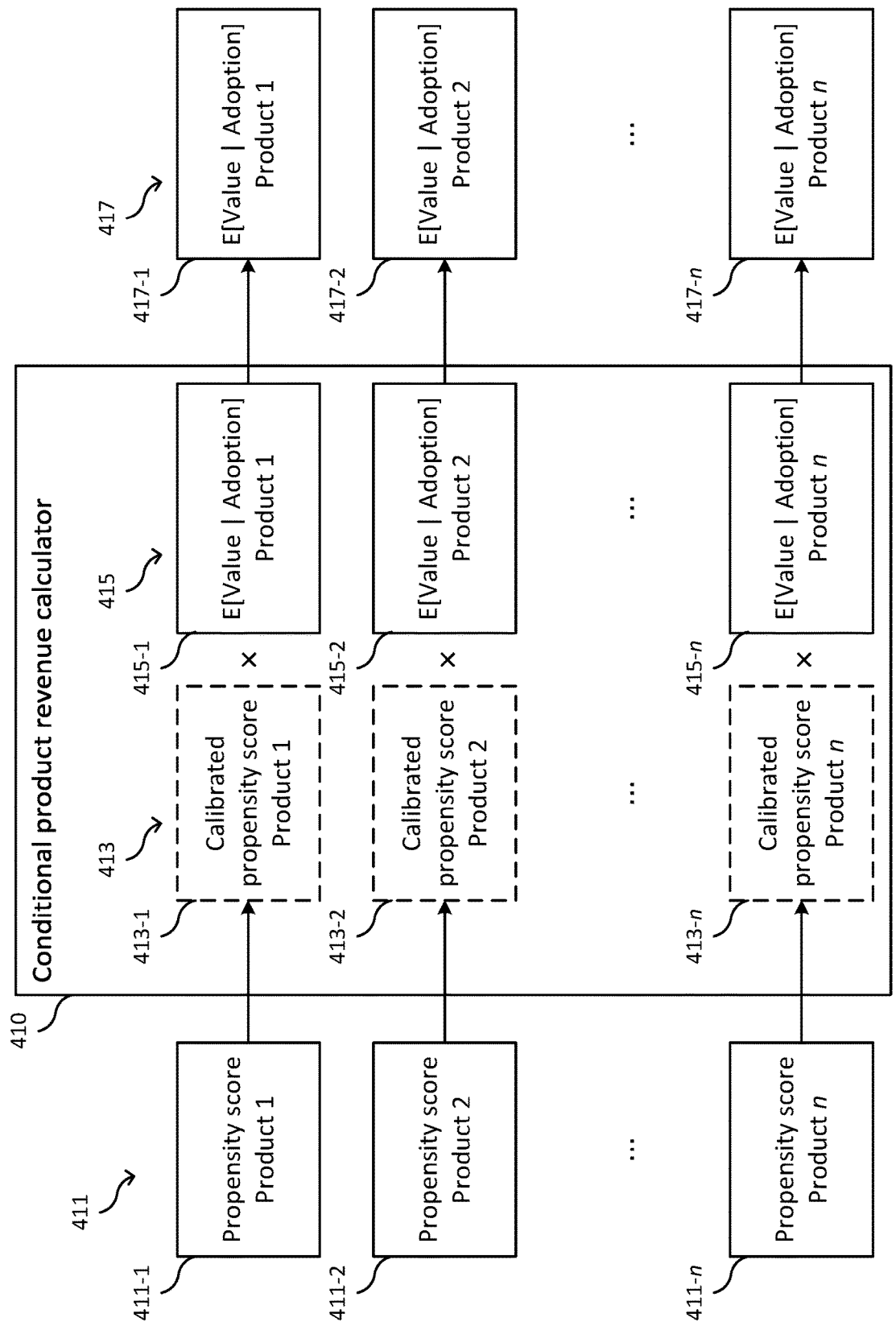
FIG. 4A is a schematic depiction of the calculation of per-user rankings of not-yet-adopted products by expected value according to one embodiment of the present disclosure.
Figure 4B:
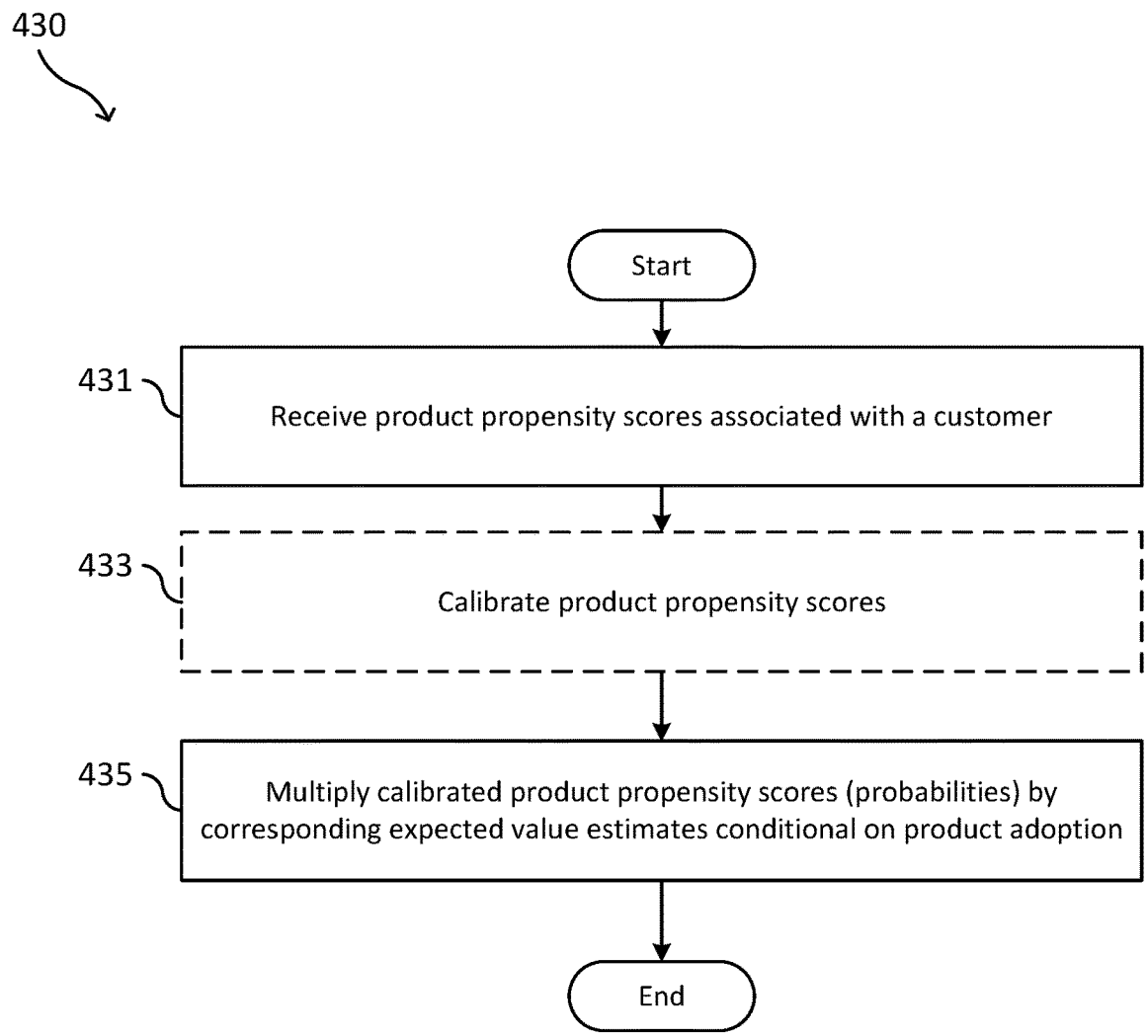
FIG. 4B is a flowchart depicting a method for estimating an expected value of a customer adoption of a product according to one embodiment of the present disclosure.

FIG. 4A is a schematic depiction of the calculation of per-user rankings of not-yet-adopted products by expected value according to one embodiment of the present disclosure. FIG. 4B is a flowchart depicting a method 430 for estimating an expected value of a customer adoption of a product according to one embodiment of the present disclosure.

As shown in FIG. 4A, a conditional product revenue calculator 410 (e.g., as one of the models 110 shown in FIG. 1A) takes one or more propensity scores 411 as one of its inputs. In various embodiments, a conditional product revenue calculator 410 using one or more computing devices as described in more detail below with respect to FIGS. 6-8.

In some embodiments, each of the propensity scores 411 represents a propensity for a given customer to adopt a corresponding product (e.g., propensity scores 411-1, 411-2, 411-n correspond to propensity scores for the user to adopt Product 1, Product 2, Product n offered by the service provider). At 431 the conditional product revenue calculator 410 receives the one or more product propensity scores, where these propensity scores 411 may be computed, in some embodiments, using a propensity score predictor 219 or a product upsell propensity predictor 311 as discussed above with respect to FIGS. 2A, 2B, 2C, 3A, 3B, and 3C.

In a case where the propensity scores 411 are not already calibrated, at 433 the conditional product revenue calculator 410 computes calibrated versions of the propensity scores 413 (e.g., calibrated propensity scores 413-1, 413-2, . . . , 413-n correspond to probabilities that the user will adopt Product 1, Product 2, . . . , Product n offered by the service provider), such as by applying an isotonic regression layer (as described above) to the propensity scores 411 received as input. The calibration at 433 may be omitted in circumstances where the one or more propensity scores 411 are already calibrated (e.g., already represent values that can be accurately treated as probabilities). At 435 the conditional product revenue calculator 410 multiplies the calibrated propensity scores 413 by corresponding expected value estimates conditional on product adoption to compute the expected revenue from the customer for each product of the service provider (e.g., for each product offered by the service provider for which the system is configured to compute expected revenue).

For the sake of discussion, the value associated with the user adoption of a product may be defined, in some embodiments, as value as the one-year post-go-live product revenue from customers who reach the go-live milestone for a product within the next 90 days. However, embodiments of the present disclosure are not limited thereto, and these time frames may be chosen to balance between the desire for a longer-term outcome and the availability of product usage data for the products offered by the service provider.

Figure 4C:
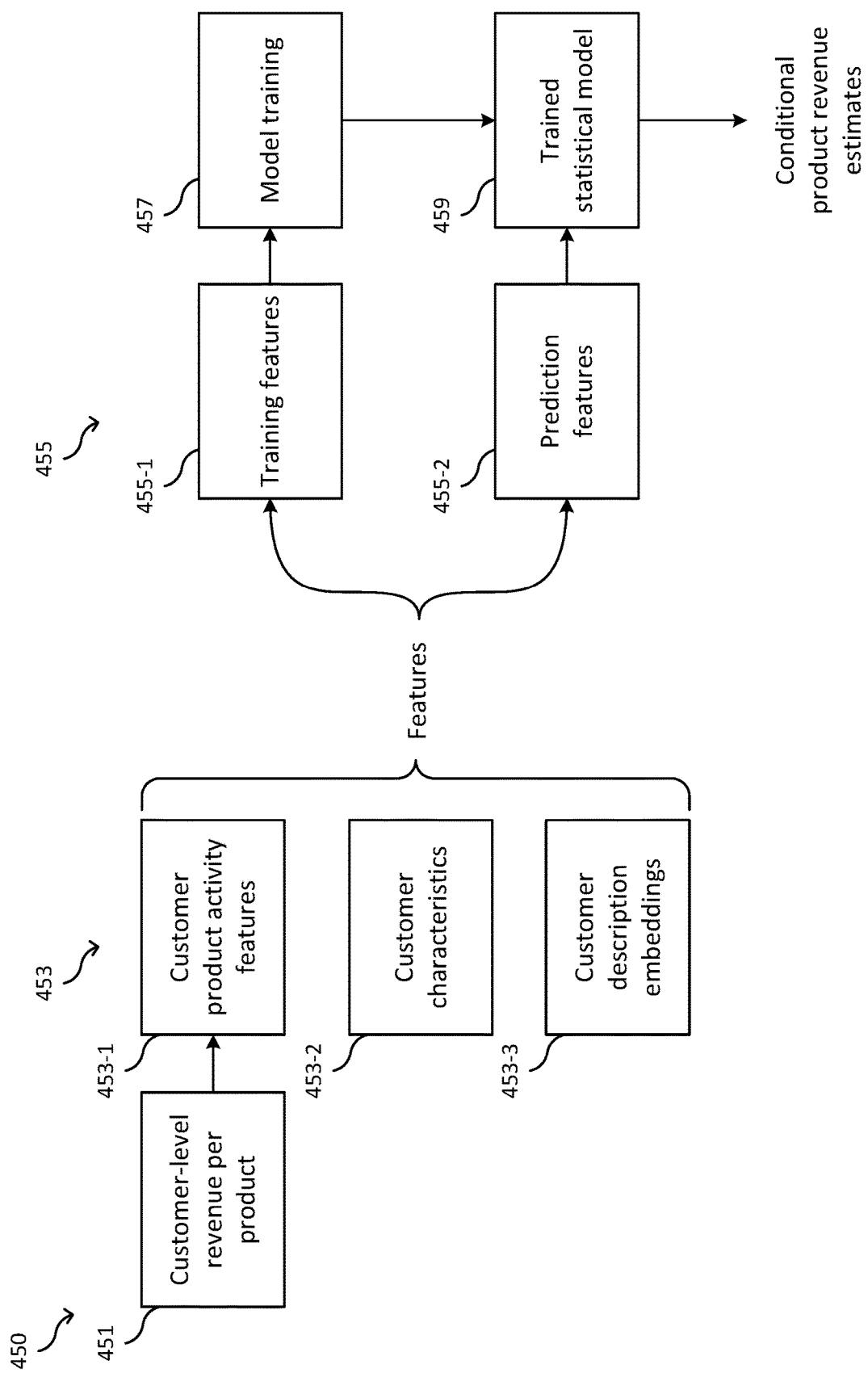
FIG. 4C is a block diagram depicting components of a system for training a model to estimate conditional product revenue according to one embodiment of the present disclosure.

FIG. 4C is a block diagram depicting components of a system 450 for training a model to estimate conditional product revenue according to one embodiment of the present disclosure. As shown in FIG. 4C, the system 450 receives data customer-level revenue data 451 from current live customers. The system 450 also loads additional features 453 such as those described above with respect to customer feature embedding 312 shown in FIG. 3A, such as customer product activity features 453-1, customer characteristics 453-2 (e.g., customer segment), and customer description embeddings 453-3 (e.g., based on text descriptions of the customer). Accordingly, in some embodiments, the features 453 shown in FIG. 4C are similar to those of the customer feature embedding 312 with the further inclusion of corresponding revenue data from that customer on a per-product basis.

During a process of training a statistical model for computing revenue on a per-product basis, a set of training features 455-1 are taken from the collected features 453, where the customer feature embedding 312 may represent an input to the model and the per-product revenue corresponds to the value being predicted by the model (e.g., the labels). Accordingly, a model training process 457 (e.g., executed by the model trainer 160 shown in FIG. 1A) trains a statistical model to predict revenue 451 for each of one or more products based on the customer features 453 (e.g., without the per-product revenue as an input to the model).

Figure 4D:
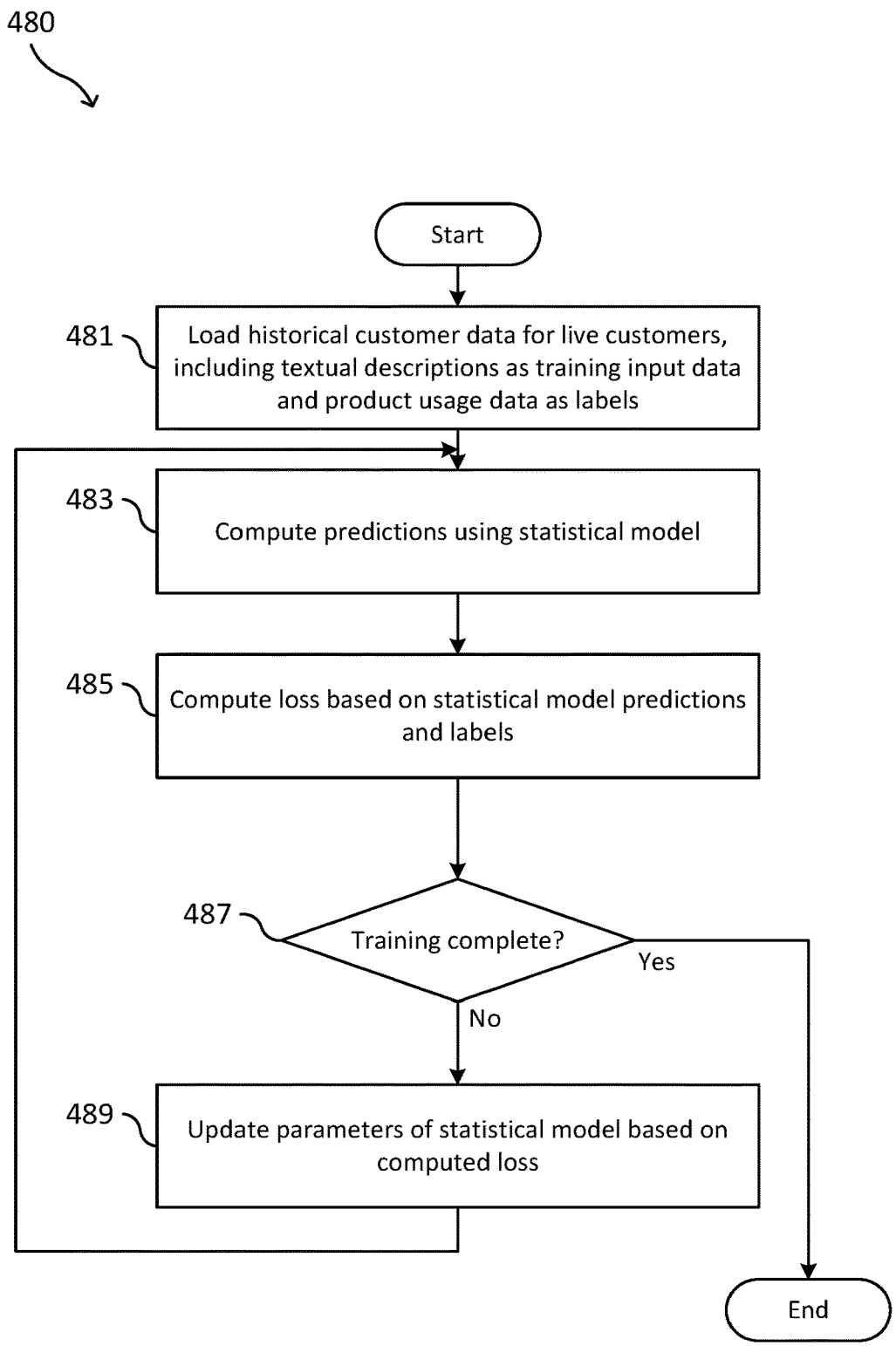
FIG. 4D is a flowchart depicting a method for training a system to estimate an expected value of a customer adoption of a product according to one embodiment of the present disclosure.

FIG. 4D is a flowchart depicting a method 480 for training a system to estimate an expected value of a customer adoption of a product according to one embodiment of the present disclosure.

In some embodiments, the method 480 shown in FIG. 4D is performed by the model trainer 160 as shown in FIG. 1A, where the model trainer 160 is implemented using one or more processing circuits executing instructions stored in one or more memory circuits, where the instructions configure the processing circuits to perform as special purpose devices to perform operations according to embodiments of the present disclosure.

As shown in FIG. 4D, at 481 the model trainer 160 loads historical customer data for live customers (and/or previously live customers) from the customer data store 150 as a training data set. This customer data includes information corresponding to the inputs that are to be supplied to the model (e.g., textual data collected from scraping customer websites, from third parties, from published information, and from customer responses to questions during the sign-up process) and features extracted from customer usage data as discussed above (e.g., reaching milestones, application usage information, product activity, interactions with the service provider, and the like). In addition, the customer data store 150 may store product usage data for products offered by the service provider since signing up with the service (e.g., which products were adopted and actively used by the customer over a time period, such as being adopted within the first 30 days or first 90 days as a live customer of the service provider). As noted above, the model trainer may further load data regarding revenue from each customer for each of a plurality of products offered by the service provider. These per-customer, per-'product revenue data serve as labels for the training data. Accordingly, using a method such as the method shown in FIG. 4D, the model trainer 160 trains a statistical model (e.g., a neural network or a fully connected layer thereof, a gradient boosting model, or the like) to predict the labels (e.g., the per-product revenue) that will be earned from a customer based on these input data.

In more detail, an initial statistical model may be provided as an additional input to the model trainer 160, where the statistical model may have its parameters (e.g., weights of connections between neurons in a case where the statistical model is a neural network) set to random values (e.g., set using a random number generator) or may have pre-trained parameters that were trained on another data set (e.g., older historical customer data or trained for a different collection of products). At 483, the model trainer 160 computes predictions using the statistical model (e.g., using its current set of parameters). These predictions may correspond to scores representing propensities for a given customer to use or adopt the various products. At 485, the model trainer 160 compares the computed predictions (the outputs of the statistical model) to the labels (e.g., the actual products used by the customers in the training data set) using a loss function to compute loss values.

At 487, the model trainer 160 determines whether the model training process for the statistical model is complete.

In some circumstances, this is determined based on whether the accuracy of the statistical model is no longer improving over the previous version of the statistical model based on the previous parameters (e.g., the training of the statistical model has converged), or has improved by less than some threshold amount. In some circumstances, this is determined based on reaching some desired level of accuracy. In some embodiments, this is determined based on reaching a maximum number of training iterations. In some embodiments, this is determined based on a combination of the factors discussed above and may include additional factors.

In a case where training is not complete, at 489 the model trainer 160 updates the parameters of the statistical model based on the computed loss. In some embodiments, this is performed using gradient descent and, in the case of a neural network, the parameters of the neural network (the weights of the connections between the layers of neurons) are updated using backpropagation. After updating the parameters of the statistical model, the model trainer 160 returns to perform another iteration of the training process at 483. Different iterations of the training process may use different portions of the training data (e.g., the training data may be broken into batches).

In a case where the model training is determined to be complete, then the trained model (e.g., the trained parameters) are output by the model trainer 160, and the trained model may be included in the trained models 110 shown in FIG. 1A and FIG. 1B (e.g., after validating the model using validation data taken from the customer data store 150).

In a manner similar to that described above with respect to the system 210, the statistical model 459 may include a single model trained to compute the conditional product revenue for all products for a given customer feature embedding or a plurality of statistical models, where each statistical model is trained to compute a conditional product revenue for a corresponding product. In the case where a shared model is used for all products, adding or removing products may involve retraining the shared model based on the change in the collection of product offerings. In the case where a separate model is trained for each product, adding or removing products may involve training a separate, new model for the new product and, in a corresponding manner, removing a statistical model corresponding to a discontinued product from the collection of models.

Referring back to FIG. 4C, after completing training of the model, a trained statistical model 459 may be used to perform predictions or estimates of conditional product revenue based on input features or prediction features 455-2 of a given customer.

The resulting conditional product revenue estimates may then be multiplied by the calibrated product propensities, as shown in FIG. 4A, to compute the expected revenue from each product for a given customer. These resulting expected revenue values may then be filtered to remove products that the customer is already subscribed to (e.g., because no estimate of the associated revenue is needed) and may then be sorted based on value to show the highest value potential products to sell or upsell to the customer. As shown in FIG. 1A, in some embodiments, the predictions 130 produced by the models 110 are supplied to marketing and promotion systems 140. The marketing and promotion systems 140

Figure 5:
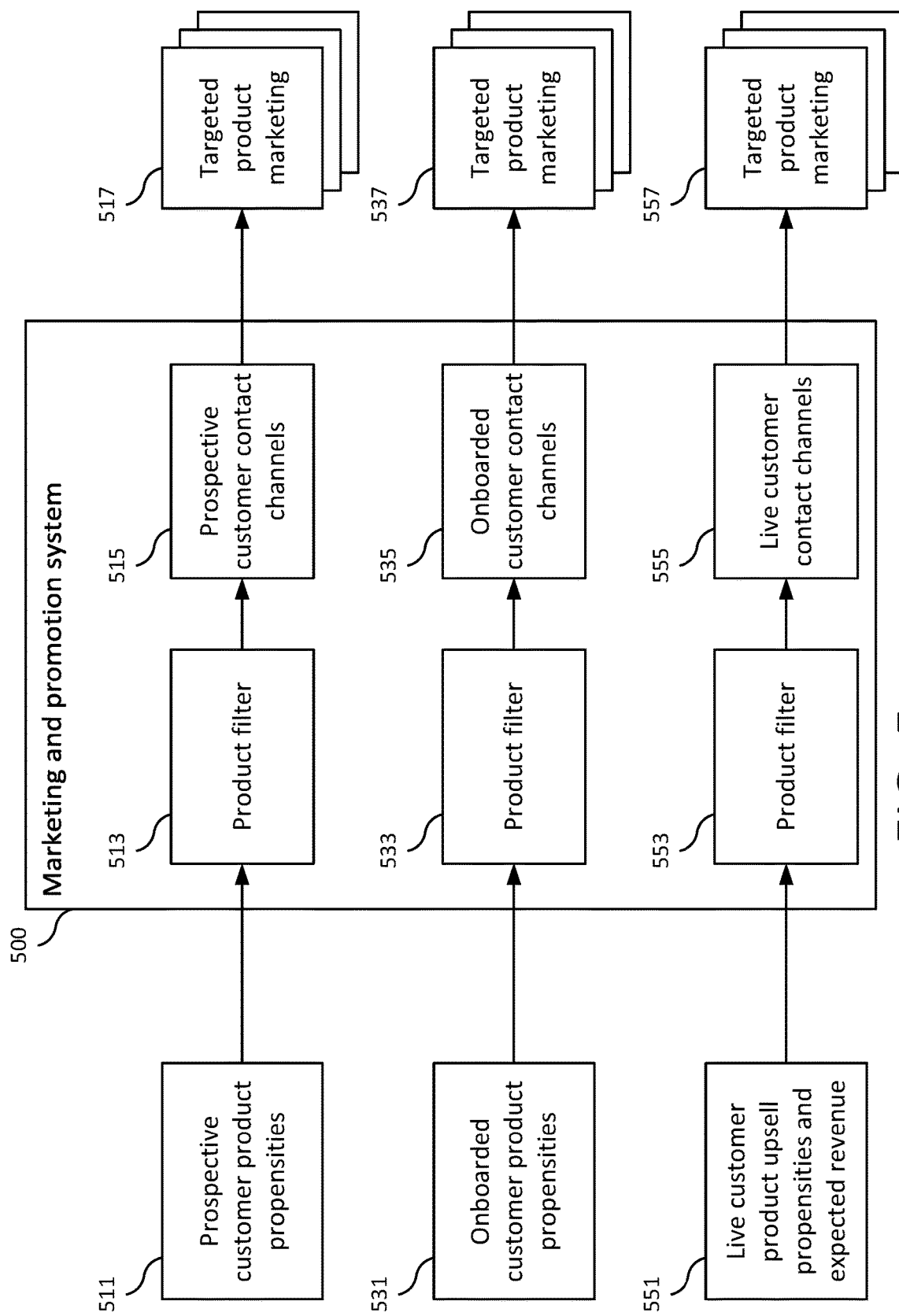
FIG. 5 is a block diagram of a marketing and promotion system configured to generate marketing recommendations based on predictions of customer propensity and conditional product revenue according to some embodiments of the present disclosure.

FIG. 5 is a block diagram of a marketing and promotion system 500 configured to generate marketing recommendations based on predictions of customer propensity and conditional product revenue according to some embodiments of the present disclosure. As shown in FIG. 5, prospective customer product propensities 511 may be supplied as input to the marketing and promotion system 500.

A product filter 513 filters the available products (e.g., the products offered by the service provider) to identify targeted products based on the prospective customer product propensities 511. In some embodiments, the product filter 513 sorts the products based on their corresponding propensities and selects some number of highest ranking products (e.g., three products having highest propensity) as targeted products for the customer. In some embodiments, the product filter 513 selects all products satisfying a propensity threshold (e.g., having a propensity score above a threshold value) as targeted products.

Prospective customers may be reachable through various prospective customer contact channels 515. These contact channels may include, but are not limited to, emails (e.g., assuming an email address is available, such as where the prospective customer signed up for a mailing list and opted into promotional emails), phone calls (e.g., with live sales agents), paper mailings, banner advertisements on web pages (e.g., targeting based on tracking cookies), and the like. Accordingly, the marketing and promotion system 500 generates targeted product marketing messages 517 for the prospective customer based on their accessibility via the corresponding prospective customer contact channels. These generated messages may include, but are not limited to, generating customized images or paper mailings promoting the specific targeted products and explanations as to why those products may be a good fit for the customer, generating sales guidance or scripts or reports for review and use by a human sales agent during discussions with the prospective customer, and the like.

Similar approaches may be applied to onboarded customers. As shown in FIG. 5, the marketing and promotion system 500 may receive onboarded customer product propensities 531 and apply these onboarded customer product propensities to a product filter 533 to identify highest propensity products for the onboarded customer. The onboarded customer contact channels 535 may be substantially the same as the contact channels of a prospective customer contact 515, but where contact information may be explicitly available as obtained through a sign-up process (e.g., email addresses and telephone numbers). Furthermore, an additional contact channel is available through user interfaces provided by the service provider, such as native applications (e.g., desktop applications and mobile applications) and web applications or websites operated by the service provider. For example, after completing a sign-up process, recommended products can be shown to a newly logged-in user to suggest ways to get started in their business relationship with the service provider, where these recommended products are identified based on the onboarded customer product propensities. Accordingly, similar targeted product marketing messages 537 are generated by the marketing and promotion system 500 and provided to the onboarded customer via corresponding contact channels 535.

Similar approaches may further be applied to live customers. As shown in FIG. 5, the marketing and promotion system 500 may receive live customer product propensities and/or expected revenue 551 (e.g., the marketing and promotion system 500 may also, or instead, receive expected revenue calculations for the customer for a plurality of products). The live customer product propensities and/or the expected revenue calculations may be supplied to a product filter 553 to identify targeted products (e.g., products having high propensity and/or high expected revenue).

The live customer contact channels 555 may be substantially the same as the contact channels of an onboarded customer contact 535. For example, after completing a sign-up process, recommended products can be shown to a live customer within a user interface for the service provider (e.g., a dashboard), where the user interface provides a location to show promoted products or recommended products. Accordingly, similar targeted product marketing messages 557 are generated by the marketing and promotion system 500 and provided to the live customer via corresponding contact channels 555.

In some embodiments, the prospective customer product propensities are computed for a cohort or audience of multiple prospective customers. For example, an advertising service may allow its user to target an audience sharing some collection of characteristics (e.g., accountants working at startup company having fewer than 100 employees). In such circumstances, the customer feature embeddings may be computed based on the descriptions available through the advertising service and the customer feature embedding for this audience is used to predict prospective customer product propensities for that audience in order to generate targeted advertisements for that audience relating to products that the target audience is more likely to adopt.

Accordingly, aspects of embodiments of the present disclosure relate to systems and methods for computing targeted product offerings for customers based on available information such as descriptions of the customers, platform usage data by the customers, and conditional product revenue. Based on the computed target product offerings, targeted advertisements or promotions are automatically presented to the corresponding customers (e.g., prospective customers, newly onboarded customers, and live customers), thereby improving the communication of the benefit of products offered by the service provider (e.g., the potential value of the products to users). This improves the value obtained by customers, who may be able to start using the products sooner than they would otherwise or who may not have known about the availability of such products. This may also improve communications between sales agents and customers by providing information (e.g., talking points) regarding the benefits of the products to those customers.

Figure 6:
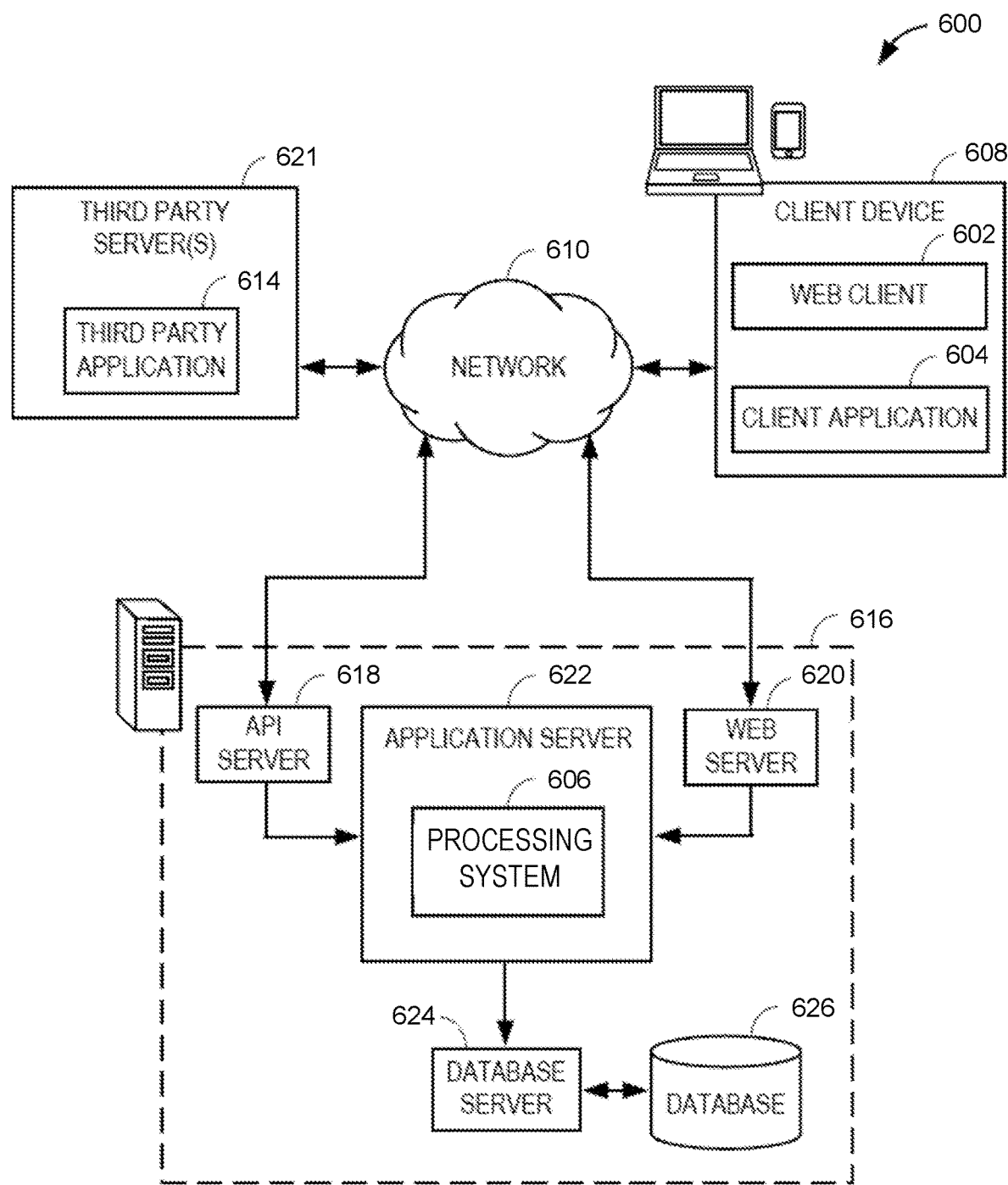
FIG. 6 is a block diagram illustrating a high-level network architecture of a computing system environment for operating a processing system according to embodiments of the present disclosure.

With reference to FIG. 6, an example embodiment of a high-level SaaS network architecture 600 is shown. A networked system 616 provides server-side functionality via a network 610 (e.g., the Internet or a WAN) to a client device 608. A web client 602 and a programmatic client, in the example form of a client application 604 (e.g., client software for accessing the service platform and through which advertisements or promotions for the platform may be displayed, client software for sales and marketing agents to review reports regarding the targeted products, and client software for operators of the service platform to control the system to compute product propensities and expected revenue for customers or groups of customers), are hosted and execute on the client device 608. The networked system 616 includes one or more servers 622 (e.g., servers hosting services exposing remote procedure call APIs), which hosts a processing system 606 (such as the processing system described above according to various embodiments of the present disclosure supporting a service product adoption system) that provides a number of functions and services via a service oriented architecture (SOA) and that exposes services to the client application 604 that accesses the networked system 616 where the services may correspond to particular workflows. The client application 604 also provides a number of interfaces described herein, which can present an output in accordance with the methods described herein to a user of the client device 608.

The client device 608 enables a user to access and interact with the networked system 616 and, ultimately, the processing system 606. For instance, the user provides input (e.g., touch screen input or alphanumeric input) to the client device 608, and the input is communicated to the networked system 616 via the network 610. In this instance, the networked system 616, in response to receiving the input from the user, communicates information back to the client device 608 via the network 610 to be presented to the user.

An API server 618 and a web server 620 are coupled, and provide programmatic and web interfaces respectively, to the servers 622. For example, the API server 618 and the web server 620 may produce messages (e.g., RPC calls) in response to inputs received via the network, where the messages are supplied as input messages to workflows orchestrated by the processing system 606. The API server 618 and the web server 620 may also receive return values (return messages) from the processing system 606 and return results to calling parties (e.g., web clients 602 and client applications 604 running on client devices 608 and third-party applications 614) via the network 610. The servers 622 host the processing system 606, which includes components or applications in accordance with embodiments of the present disclosure as described above. The servers 622 are, in turn, shown to be coupled to one or more database servers 624 that facilitate access to information storage repositories (e.g., databases 626). In an example embodiment, the databases 626 includes storage devices that store information accessed and generated by the processing system 606 such as databases storing descriptions of users, platform usage data, product revenue on a per customer basis, trained models, and the like.

Additionally, a third-party application 614, executing on one or more third-party servers 621, is shown as having programmatic access to the networked system 616 via the programmatic interface provided by the API server 618. For example, the third-party application 614, using information retrieved from the networked system 616, may support one or more features or functions on a website hosted by a third-party. For example, the third-party application 614 may serve as a data source for retrieving, for example, descriptions of customers or other non-text data regarding customers (e.g., prospective customers) may also be accessed by the processing system 606.

Turning now specifically to the applications hosted by the client device 608, the web client 602 may access the various systems (e.g., the processing system 606) via the web interface supported by the web server 620. Similarly, the client application 604 (e.g., an "app" such as a payment processor app) may access the various services and functions provided by the processing system 606 via the programmatic interface provided by the API server 618. The client application 604 may be, for example, an "app" executing on the client device 608, such as an iOS or Android OS application to enable a user to access and input data on the networked system 616 in an offline manner and to perform batch-mode communications between the client application 604 and the networked system 616.

Further, while the network architecture 600 shown in FIG. 6 employs a client-server architecture, the present disclosure is not limited to such an architecture, and could equally well find application in a distributed, or peer-to-peer, architecture system, for example.

Figure 7:
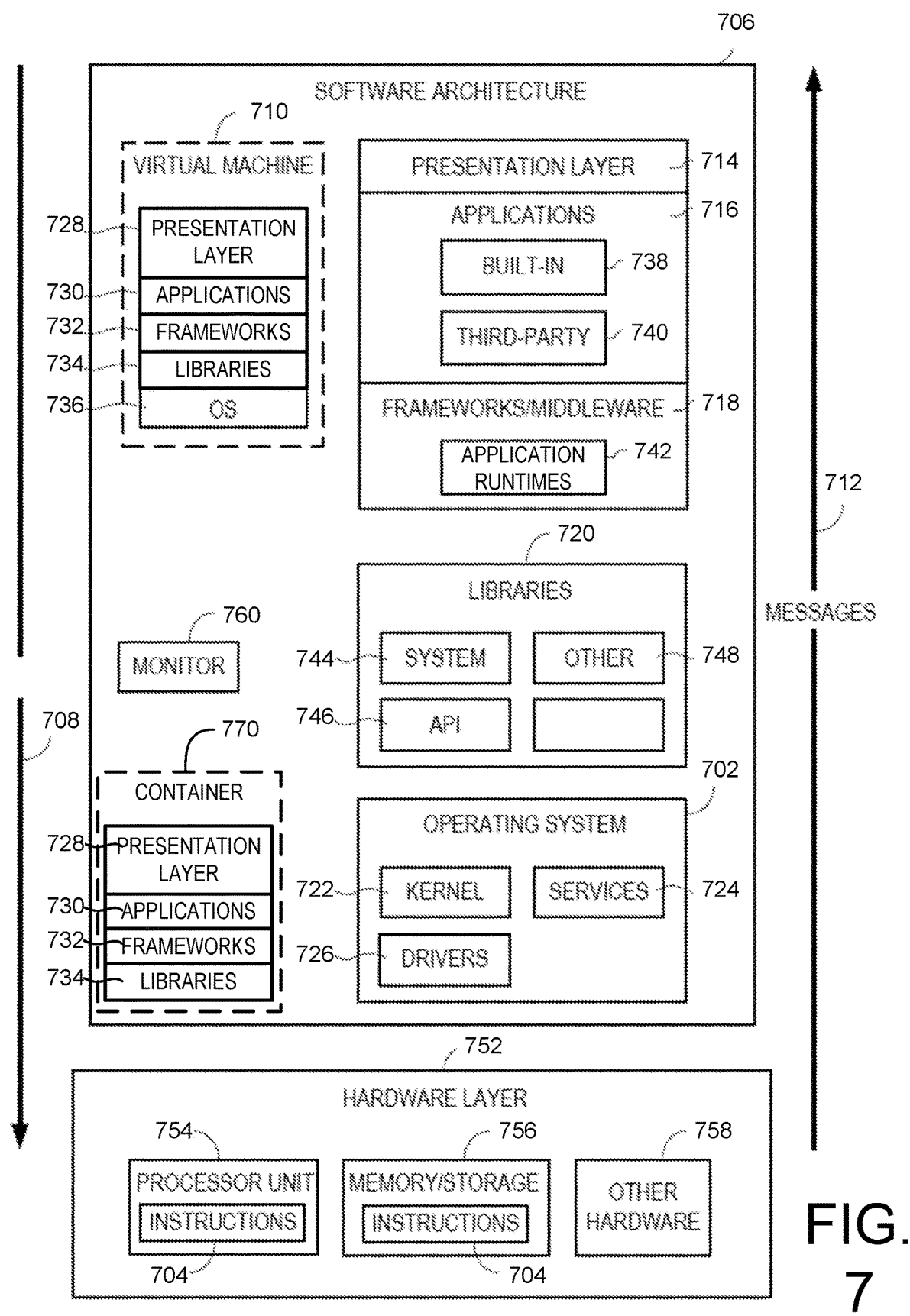
FIG. 7 is a block diagram illustrating a representative software architecture, which may be used in conjunction with various hardware architectures as described herein.

FIG. 7 is a block diagram illustrating an example software architecture 706, which may be used in conjunction with various hardware architectures herein described.

FIG. 7 is a non-limiting example of a software architecture 706, and it will be appreciated that many other architectures may be implemented to facilitate the functionality described herein. The software architecture 706 may execute on hardware such as a machine 800 of FIG. 8 that includes, among other things, processors 804, memory/storage 806, and input/output (I/O) components 818. A representative hardware layer 752 is illustrated and can represent, for example, the machine 800 of FIG. 8. The representative hardware layer 752 includes a processor 754 having associated executable instructions 704. The executable instructions 704 represent the executable instructions of the software architecture 706, including implementation of the methods, components, and so forth described herein. The hardware layer 752 also includes non-transitory memory and/or storage modules as memory/storage 756, which also have the executable instructions 704. The hardware layer 752 may also include other hardware 758.

In the example architecture of FIG. 7, the software architecture 706 may be conceptualized as a stack of layers where each layer provides particular functionality. For example, the software architecture 706 may include layers such as an operating system 702, libraries 720, frameworks/middleware 718, applications 716 (such as the services of the processing system), and a presentation layer 714. Operationally, the applications 716 and/or other components within the layers may invoke API calls 708 through the software stack and receive a response as messages 712 in response to the API calls 708. The layers illustrated are representative in nature, and not all software architectures have all layers. For example, some mobile or special-purpose operating systems may not provide a frameworks/middleware 718, while others may provide such a layer. Other software architectures may include additional or different layers.

The operating system 702 may manage hardware resources and provide common services. The operating system 702 may include, for example, a kernel 722, services 724, and drivers 726. The kernel 722 may act as an abstraction layer between the hardware and the other software layers. For example, the kernel 722 may be responsible for memory management, processor management (e.g., scheduling), component management, networking, security settings, and so on. The services 724 may provide other common services for the other software layers. The drivers 726 are responsible for controlling or interfacing with the underlying hardware. For instance, the drivers 726 include display drivers, camera drivers, Bluetooth® drivers, flash memory drivers, serial communication drivers (e.g., Universal Serial Bus (USB) drivers), Wi-Fi® drivers, audio drivers, power management drivers, and so forth depending on the hardware configuration.

The libraries 720 provide a common infrastructure that is used by the applications 716 and/or other components and/or layers. The libraries 720 provide functionality that allows other software components to perform tasks in an easier fashion than by interfacing directly with the underlying operating system 702 functionality (e.g., kernel 722, services 724, and/or drivers 726). The libraries 720 may include system libraries 744 (e.g., C standard library) that may provide functions such as memory allocation functions, string manipulation functions, mathematical functions, and the like. In addition, the libraries 720 may include API libraries 746 such as media libraries (e.g., libraries to support presentation and manipulation of various media formats such as MPEG4, H.264, MP3, AAC, AMR, JPG, and PNG), graphics libraries (e.g., an OpenGL framework that may be used to render 2D and 3D graphic content on a display), database libraries (e.g., SQLite that may provide various relational database functions), and the like. The libraries 720 may also include a wide variety of other libraries 748 to provide many other APIs to the applications 716 and other software components/modules.

The frameworks/middleware 718 provide a higher-level common infrastructure that may be used by the applications 716 and/or other software components/modules. For example, the frameworks/middleware 718 may provide high-level resource management functions, web application frameworks, application runtimes 742 (e.g., a Java virtual machine or JVM), and so forth. The frameworks/middleware 718 may provide a broad spectrum of other APIs that may be utilized by the applications 716 and/or other software components/modules, some of which may be specific to a particular operating system or platform.

The applications 716 include built-in applications 738 and/or third-party applications 740. The applications 716 may use built-in operating system functions (e.g., kernel 722, services 724, and/or drivers 726), libraries 720, and frameworks/middleware 718 to create user interfaces to interact with users of the system. Alternatively, or additionally, in some systems, interactions with a user may occur through a presentation layer, such as the presentation layer 714. In these systems, the application/component "logic" can be separated from the aspects of the application/component that interact with a user.

Some software architectures use virtual machines. In the example of FIG. 7, this is illustrated by a virtual machine 710. The virtual machine 710 creates a software environment where applications/components can execute as if they were executing on a hardware machine (such as the machine 800 of FIG. 8, for example). The virtual machine 710 is hosted by a host operating system (e.g., the operating system 702 in FIG. 7) and typically, although not always, has a virtual machine monitor 760 (or hypervisor), which manages the operation of the virtual machine 710 as well as the interface with the host operating system (e.g., the operating system 702). A software architecture executes within the virtual machine 710 such as an operating system (OS) 736, libraries 734, frameworks 732, applications 730, and/or a presentation layer 728. These layers of software architecture executing within the virtual machine 710 can be the same as corresponding layers previously described or may be different.

Some software architectures use containers 770 or containerization to isolate applications. The phrase "container image" refers to a software package (e.g., a static image) that includes configuration information for deploying an application, along with dependencies such as software components, frameworks, or libraries that are required for deploying and executing the application. As discussed herein, the term "container" refers to an instance of a container image, and an application executes within an execution environment provided by the container. Further, multiple instances of an application can be deployed from the same container image (e.g., where each application instance executes within its own container). Additionally, as referred to herein, the term "pod" refers to a set of containers that accesses shared resources (e.g., network, storage), and one or more pods can be executed by a given computing node. A container 770 is similar to a virtual machine in that it includes a software architecture including libraries 734, frameworks 732, applications 730, and/or a presentation layer 728, but omits an operating system and, instead, communicates with the underlying host operating system 702.

Figure 8:
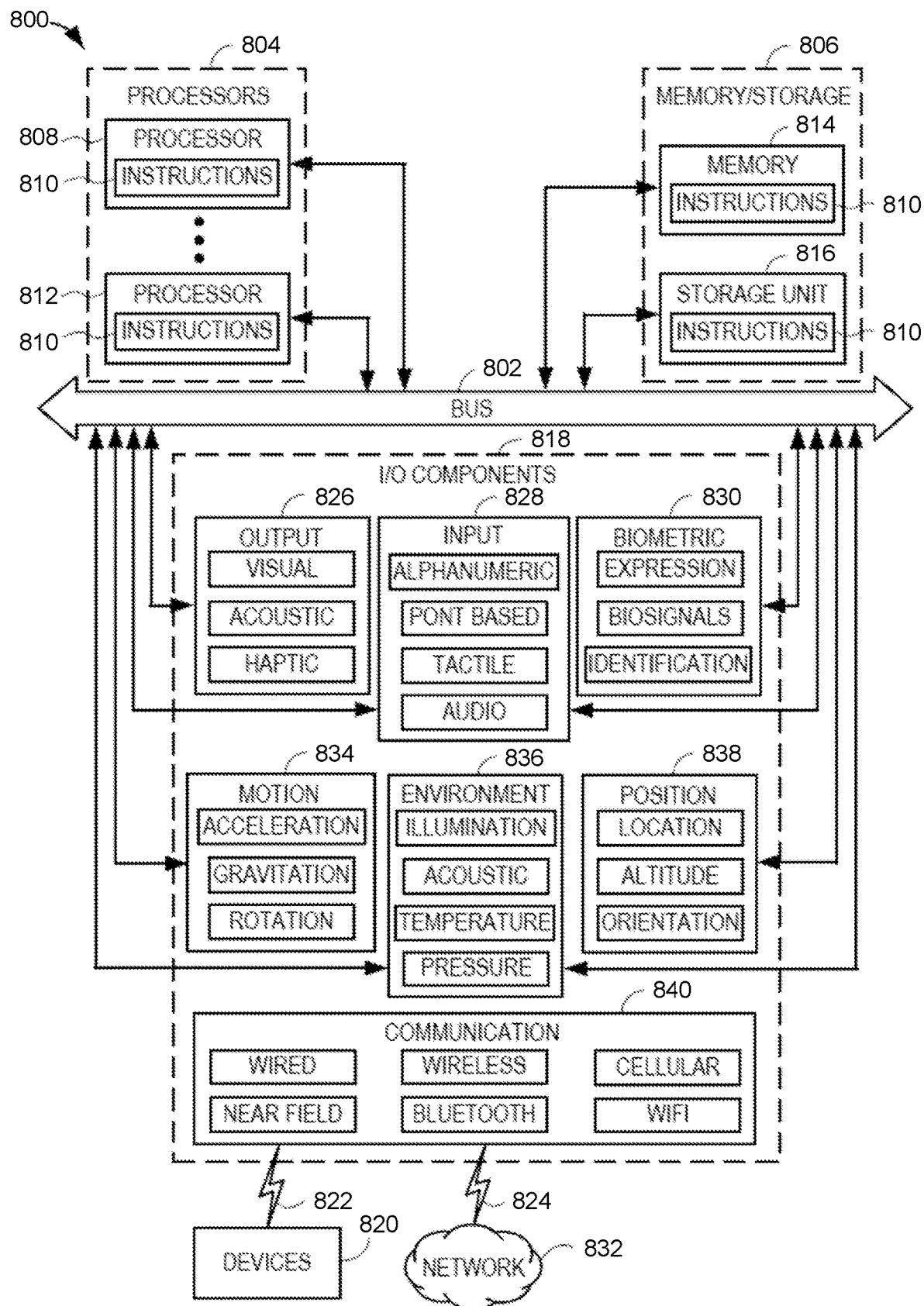
FIG. 8 is a block diagram illustrating components of a processing circuit or a processor, according to some example embodiments, configured to read instructions from a non-transitory computer-readable medium (e.g., a non-transitory machine-readable storage medium) and perform any one or more of the methods discussed herein.

FIG. 8 is a block diagram illustrating components of a machine 800, according to some example embodiments, able to read instructions from a non-transitory machine-readable medium (e.g., a computer-readable storage medium) and perform any one or more of the methodologies discussed herein. Specifically, FIG. 8 shows a diagrammatic representation of the machine 800 in the example form of a computer system, within which instructions 810 (e.g., software, a program, an application, an applet, an app, or other executable code) for causing the machine 800 to perform any one or more of the methodologies discussed herein may be executed. As such, the instructions 810 may be used to implement modules or components described herein. The instructions 810 transform the general, non-programmed machine 800 into a particular machine 800 programmed to carry out the described and illustrated functions in the manner described. In alternative embodiments, the machine 800 operates as a standalone device or may be coupled (e.g., networked) to other machines. In a networked deployment, the machine 800 may operate in the capacity of a server machine or a client machine in a server-client network environment, or as a peer machine in a peer-to-peer (or distributed) network environment. The machine 800 may include, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 810, sequentially or in parallel or concurrently, that specify actions to be taken by the machine 800. Further, while only a single machine 800 is illustrated, the term "machine" or "processing circuit" shall also be taken to include a collection of machines that individually or jointly execute the instructions 810 to perform any one or more of the methodologies discussed herein.

The machine 800 may include processors 804 (including processors 808 and 812), memory/storage 806, and I/O components 818, which may be configured to communicate with each other such as via a bus 802. The memory/storage 806 may include a memory 814, such as a main memory, or other memory storage, and a storage unit 816, both accessible to the processors 804 such as via the bus 802. The storage unit 816 and memory 814 store the instructions 810 embodying any one or more of the methodologies or functions described herein. The instructions 810 may also reside, completely or partially, within the memory 814, within the storage unit 816, within at least one of the processors 804 (e.g., within the processor's cache memory), or any suitable combination thereof, during execution thereof by the machine 800. Accordingly, the memory 814, the storage unit 816, and the memory of the processors 804 are examples of machine-readable media.

The I/O components 818 may include a wide variety of components to receive input, provide output, produce output, transmit information, exchange information, capture measurements, and so on. The specific I/O components 818 that are included in a particular machine will depend on the type of machine. For example, portable machines such as mobile phones may include a touch input device or other such input mechanisms, while a headless server machine will likely not include such a touch input device. It will be appreciated that the I/O components 818 may include many other components that are not shown in FIG. 8. The I/O components 818 are grouped according to functionality merely for simplifying the following discussion, and the grouping is in no way limiting. In various example embodiments, the I/O components 818 may include output components 826 and input components 828. The output components 826 may include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 828 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or other pointing instruments), tactile input components (e.g., a physical button, a touch screen that provides location and/or force of touches or touch gestures, or other tactile input components), audio input components (e.g., a microphone), and the like.

In further example embodiments, the I/O components 818 may include biometric components 830, motion components 834, environment components 836, or position components 838, among a wide array of other components. For example, the biometric components 830 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 834 may include acceleration sensor components (e.g., accelerometer), gravitation sensor components, rotation sensor components (e.g., gyroscope), and so forth. The environment components 836 may include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas sensors to detect concentrations of hazardous gases for safety or to measure pollutants in the atmosphere), or other components that may provide indications, measurements, or signals corresponding to a surrounding physical environment. The position components 838 may include location sensor components (e.g., a Global Positioning System (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 818 may include communication components 840 operable to couple the machine 800 to a network 832 or devices 820 via a coupling 824 and a coupling 822, respectively. For example, the communication components 840 may include a network interface component or other suitable device to interface with the network 832. In further examples, the communication components 840 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 820 may be another machine or any of a wide variety of peripheral devices (e.g., a peripheral device coupled via a USB).

Moreover, the communication components 840 may detect identifiers or include components operable to detect identifiers. For example, the communication components 840 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 840, such as location via Internet Protocol (IP) geo-location, location via Wi-Fi® signal triangulation, location via detecting an NFC beacon signal that may indicate a particular location, and so forth.

According to one embodiment of the present disclosure, a method includes: extracting text features from one or more text descriptions of a customer using a language model; computing a customer feature embedding based on the text features; computing a plurality of product propensities for the customer by supplying the customer feature embedding to a trained statistical model, the product propensities representing likelihoods that the customer will adopt corresponding products offered by a service platform; identifying one or more targeted products based on the product propensities; and generating one or more targeted product marketing messages to the customer based on the one or more targeted products.

The trained statistical model may include a fully connected layer of a neural network or gradient boosting with a forest of decision trees.

The trained statistical model may be trained based on training data including: one or more training text descriptions of one or more live customers of the service platform; and product usage information for the corresponding products offered by the service platform. The product usage information may include historical data regarding product adoption within a time period.

The method may further include retrieving the one or more text descriptions from one or more of: a website associated with the customer; a third-party data source of company information; and a publication regarding the customer.

The customer may be an onboarded customer of the service platform, and the one or more text descriptions may include an answer to a question presented to the customer during a sign-up process. The method may further include displaying the one or more targeted product marketing messages in a user interface for the customer.

The customer may be a live customer of the service platform, and the method may further include collecting platform usage data from the customer based on interactions between the customer and the service platform.

The method may further include: computing a plurality of expected revenue values for the corresponding products offered by the service platform based on multiplying the product propensities by conditional expected product revenue values of the customer for the corresponding products offered by the service platform. The conditional expected product revenue values may be computed by a second statistical model, the second statistical model trained based on historical data associating customer feature embeddings to customer-level revenue for the corresponding products offered by the service platform.

According to one embodiment of the present disclosure, a computer system includes: a processor; and memory storing instructions that, when executed by the processor, cause the processor to: extract text features from one or more text descriptions of a customer using a language model; compute a customer feature embedding based on the text features; compute a plurality of product propensities for the customer by supplying the customer feature embedding to a trained statistical model, the product propensities representing likelihoods that the customer will adopt corresponding products offered by a service platform; identify one or more targeted products based on the product propensities; and generate one or more targeted product marketing messages to the customer based on the one or more targeted products.

The trained statistical model may include a fully connected layer of a neural network or gradient boosting with a forest of decision trees.

The trained statistical model may be trained based on training data including: one or more training text descriptions of one or more live customers of the service platform; and product usage information for the corresponding products offered by the service platform. The product usage information may include historical data regarding product adoption within a time period.

The memory may further store instructions that, when executed by the processor, cause the processor to retrieve the one or more text descriptions from one or more of: a website associated with the customer; a third-party data source of company information; and a publication regarding the customer.

The customer may be an onboarded customer of the service platform, and the one or more text descriptions include an answer to a question presented to the customer during a sign-up process.

The memory may further store instructions that, when executed by the processor, cause the processor to display the one or more targeted product marketing messages in a user interface for the customer.

The customer may be a live customer of the service platform, and the memory may further store instructions that, when executed by the processor, cause the processor to collect platform usage data from the customer based on interactions between the customer and the service platform.

The memory may further store instructions that, when executed by the processor, cause the processor to: compute a plurality of expected revenue values for the corresponding products offered by the service platform based on multiplying the product propensities by conditional expected product revenue values of the customer for the corresponding products offered by the service platform. The conditional expected product revenue values may be computed by a second statistical model, the second statistical model trained based on historical data associating customer feature embeddings to customer-level revenue for the corresponding products offered by the service platform.

It should be understood that the sequence of steps of the processes described herein in regard to various methods and with respect various flowcharts is not fixed, but can be modified, changed in order, performed differently, performed sequentially, concurrently, or simultaneously, or altered into any desired order consistent with dependencies between steps of the processes, as recognized by a person of skill in the art. Further, as used herein and in the claims, the phrase "at least one of element A, element B, or element C" is intended to convey any of: element A, element B, element C, elements A and B, elements A and C, elements B and C, and elements A, B, and C.

While the present invention has been described in connection with certain exemplary embodiments, it is to be understood that the invention is not limited to the disclosed embodiments, but, on the contrary, is intended to cover various modifications and equivalent arrangements included within the spirit and scope of the appended claims, and equivalents thereof.

What is claimed is:

1. A method comprising:
   extracting text features from one or more text descriptions regarding a business of a customer using a language model, wherein the one or more text descriptions are retrieved from one or more of:
      a website associated with the customer;
      a third-party data source of company information; and
      a publication regarding the customer;
   retrieving non-text features from data associated with the customer;
   formatting the text features as feature vectors to combine with non-text features that include numerical data;
   combining text features with non-text features associated with the customer;
   computing a first customer feature embedding based on the combined features, wherein the combined features are normalized for inclusion in the first customer feature embedding;
   computing, by one or more processing circuits of one or more computing devices, each product of a plurality of products, a corresponding product propensity of a plurality of product propensities representing likelihoods that the customer will adopt a corresponding product of the plurality of products, the plurality of product propensities being computed by supplying the first customer feature embedding to a trained first statistical model comprising a fully connected layer of a neural network trained based on product usage information of the plurality of products by a plurality of live customers of a service platform actively using the plurality of products, wherein the product usage information includes live customers interaction with user interfaces of the products and usage of products offered by the service platform;
   identifying one or more targeted products based on the product propensities; and
   generating one or more messages to the customer based on the one or more targeted products,
   wherein the trained first statistical model is trained in accordance with:
      loading historical customer data comprising the product usage information of the plurality of products by the plurality of live customers of the service platform;
      computing predictions using a preliminary statistical model;
      computing a loss based on predictions made by the preliminary statistical model and labels; and
      updating parameters of the preliminary statistical model to compute the trained first statistical model.

2. The method of claim 1, wherein the trained first statistical model further comprises gradient boosting with a forest of decision trees.

3. The method of claim 1, wherein the trained first statistical model is further trained based on training data comprising:
   one or more training text descriptions of one or more live customers of the service platform.

4. The method of claim 3, wherein the product usage information comprises historical data regarding product adoption within a time period.

5. The method of claim 1, wherein the customer is an onboarded customer of the service platform, and
   wherein the one or more text descriptions comprise an answer to a question presented to the customer during a sign-up process.

6. The method of claim 5, further comprising displaying the one or more messages in a user interface for the customer.

7. The method of claim 1, wherein the customer is a live customer of the service platform, and
   wherein the method further comprises collecting platform usage data from the customer based on interactions between the customer and the service platform.

8. The method of claim 1, further comprising:
   computing a plurality of expected revenue values for the corresponding products offered by the service platform based on multiplying the product propensities by conditional expected product revenue values of the customer for the corresponding products offered by the service platform.

9. The method of claim 8, wherein the conditional expected product revenue values are computed by a second statistical model, the second statistical model trained based on historical data associating customer feature embeddings to customer-level revenue for the corresponding products offered by the service platform.

10. A computer system comprising:
    a processor; and
    memory storing instructions that, when executed by the processor, cause the processor to:
       extract text features from one or more text descriptions regarding a business of a customer using a language model;
       retrieve non-text features from data associated with the customer;
       format the text features as feature vectors to combine with non-text features that include numerical data;
       combine text features with non-text features associated with the customer;
       compute a first customer feature embedding based on the combined features, wherein the combined features are normalized for inclusion in the first customer feature embedding;
       compute, for each product of a plurality of products offered by a service platform, a corresponding product propensity of a plurality of product propensities representing likelihoods that the customer will adopt a corresponding product of the plurality of products offered by the service platform, the plurality of products being computed by supplying the first customer feature embedding a trained first statistical model comprising gradient boosting with a forest of decision trees;
       identify one or more targeted products based on the product propensities; and
       generate one or more messages to the customer based on the one or more targeted products,
       wherein the trained first statistical model is trained in accordance with:

loading historical customer data comprising product usage information of the plurality of products by the plurality of live customers of the service platform;

computing predictions using a preliminary statistical model;

computing a loss based on predictions made by the preliminary statistical model and labels; and updating parameters of the preliminary statistical model to compute the trained first statistical model.

11. The computer system of claim 10, wherein the trained first statistical model further comprises a fully connected layer of a neural network.

12. The computer system of claim 10, wherein the trained first statistical model is further trained based on training data comprising:

one or more training text descriptions of one or more live customers of the service platform.

13. The computer system of claim 12, wherein the product usage information comprises historical data regarding product adoption within a time period.

14. The computer system of claim 10, wherein the memory further stores instructions that, when executed by the processor, cause the processor to retrieve the one or more text descriptions from one or more of:

a website associated with the customer;

a third-party data source of company information; and a publication regarding the customer.

15. The computer system of claim 10, wherein the customer is an onboarded customer of the service platform, and wherein the one or more text descriptions comprise an answer to a question presented to the customer during a sign-up process.

16. The computer system of claim 15, wherein the memory further stores instructions that, when executed by the processor, cause the processor to display the one or more messages in a user interface for the customer.

17. The computer system of claim 10, wherein the customer is a live customer of the service platform, and wherein the memory further stores instructions that, when executed by the processor, cause the processor to collect platform usage data from the customer based on interactions between the customer and the service platform.

18. The computer system of claim 10, wherein the memory further stores instructions that, when executed by the processor, cause the processor to:

compute a plurality of expected revenue values for the corresponding products offered by the service platform based on multiplying the product propensities by conditional expected product revenue values of the customer for the corresponding products offered by the service platform.

19. The computer system of claim 18, wherein the conditional expected product revenue values are computed by a second statistical model, the second statistical model trained based on historical data associating customer feature embeddings to customer-level revenue for the corresponding products offered by the service platform.

* * * * *